United States Patent
Li et al.

(10) Patent No.: US 12,413,498 B2
(45) Date of Patent: Sep. 9, 2025

(54) METHOD FOR DETECTING MULTICAST SERVICE FLOW AND RELATED APPARATUS

(71) Applicant: Huawei Technologies Co., Ltd., Shenzhen (CN)

(72) Inventors: Weidong Li, Beijing (CN); Xiaofei Wang, Beijing (CN); Naiwen Wei, Beijing (CN); Tianran Zhou, Beijing (CN); Runsheng Han, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 18/300,593

(22) Filed: Apr. 14, 2023

(65) Prior Publication Data
US 2023/0261962 A1    Aug. 17, 2023

Related U.S. Application Data

(63) Continuation of application No. PCT/CN2021/123084, filed on Oct. 11, 2021.

(30) Foreign Application Priority Data

Oct. 14, 2020  (CN) .......................... 202011097361.4

(51) Int. Cl.
*H04L 43/50* (2022.01)
*H04L 12/18* (2006.01)
(Continued)

(52) U.S. Cl.
CPC .............. *H04L 43/50* (2013.01); *H04L 12/18* (2013.01); *H04L 43/0829* (2013.01);
(Continued)

(58) Field of Classification Search
CPC ..... H04L 43/50; H04L 12/18; H04L 43/0829; H04L 43/0852; H04L 45/16; H04L 47/35;
(Continued)

(56) References Cited

FOREIGN PATENT DOCUMENTS

| CN | 110999230 B | 6/2021 |
|---|---|---|
| EP | 4030696 A1 | 7/2022 |

OTHER PUBLICATIONS

Ma Peiyong et al., "Key technologies and development of 5G bearer network", Telecommunications Science Issue 9, Sep. 20, 2020, with English abstract total 9 pages.
(Continued)

*Primary Examiner* — Nam T Huynh
(74) *Attorney, Agent, or Firm* — Conley Rose, P.C.

(57) ABSTRACT

A method for detecting a multicast service flow includes receiving, by a first node, a multicast service flow from a multicast source; encapsulating, by the first node, an In-situ Flow Information Telemetry (IFIT) extension header into a data packet in the multicast service flow, where the IFIT extension header includes a first detection identifier, and the first detection identifier is used to identify the detected multicast service flow; copying, by the first node according to a quantity of next-hop second nodes of the first node, the data packet encapsulated with the IFIT extension header; and sending, by the first node to each next-hop second node, the data packet encapsulated with the IFIT extension header. The first node is a head node in a multicast detection domain.

20 Claims, 9 Drawing Sheets

(51) Int. Cl.
    *H04L 43/0829*    (2022.01)
    *H04L 43/0852*    (2022.01)
    *H04L 45/16*      (2022.01)
    *H04L 47/35*      (2022.01)

(52) U.S. Cl.
    CPC .......... *H04L 43/0852* (2013.01); *H04L 45/16* (2013.01); *H04L 47/35* (2013.01)

(58) Field of Classification Search
    CPC ... H04L 12/1854; H04L 45/50; H04L 43/106; H04L 43/08; H04L 45/74; H04L 47/28
    See application file for complete search history.

(56) References Cited

OTHER PUBLICATIONS

H. Song, et al., "Requirement and Solution for Multicast Traffic On-path Telemetry," draft-song-multicast-telemetry-05, Oct. 5, 2020, 11 pages.

H. Song, et al., "In-situ Flow Information Telemetry," draft-song-opsawg-ifit-framework-10, Dec. 31, 2019, 26 pages.

G. Fioccola, Ed., et al., "Alternate-Marking Method for Passive and Hybrid Performance Monitoring," RFC 8321, Jan. 2018, 33 pages.

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| | | | | | | | | | | Flow ID | | | | | | | | | | L | D | | | | | | | | | | |

FIG. 1

METHOD FOR DETECTING MULTICAST SERVICE FLOW AND RELATED APPARATUS

CROSS-REFERENCE TO RELATED APPLICATIONS

This application is a continuation application of International Patent Application No. PCT/CN2021/123084 filed on Oct. 11, 2021, which claims priority to Chinese Patent Application No. 202011097361.4 filed on Oct. 14, 2020. The disclosures of the aforementioned applications are hereby incorporated by reference in their entireties.

TECHNICAL FIELD

This application relates to the field of communication technologies, and in particular, to a method for detecting a multicast service flow and a related apparatus.

BACKGROUND

A network performance detection technology is a common research hotspot in the Internet field and the telecommunication field. Various performance detection technologies analyze, evaluate, control, and adjust a network running status by monitoring, measuring, and collecting network performance data, so as to provide long-term stable and reliable network services, which is the basis of network running.

A method for performing network performance detection by encapsulating an In-situ Flow Information Telemetry (IFIT) extension header in a detected service packet is still limited to the field of unicast service detection, and detection for a multicast service is a problem to be urgently resolved currently.

SUMMARY

Embodiments of this application provide a method for detecting a multicast service flow and a related apparatus, so that a multicast service flow can be detected by using an IFIT.

According to a first aspect, an embodiment of this application provides a method for detecting a multicast service flow. The method includes a first node that receives a multicast service flow sent by a multicast source, the first node encapsulates an IFIT extension header into a data packet in the multicast service flow, where the IFIT extension header includes a first detection identifier, and the first detection identifier is used to identify the detected multicast service flow, the first node copies, according to a quantity of next-hop second nodes of the first node, the data packet encapsulated with the IFIT extension header, and the first node sends the data packet encapsulated with the IFIT extension header to each next-hop second node.

The first node is a head node in a multicast detection domain. In this embodiment of this application, the first node encapsulates the IFIT extension header into the received data packet in the multicast service flow, and therefore the IFIT extension header may be inserted into the multicast service flow. Then, the first node copies the data packet encapsulated with the IFIT extension header, and sends the data packet encapsulated with the IFIT extension header to a next-hop node. In this way, the data packet encapsulated with the IFIT extension header may be forwarded along with the multicast service flow in the detection domain. Therefore, performance detection may be performed on the multicast service by using the IFIT.

In a possible implementation of the first aspect, a detection identifier in the copied IFIT extension header is the same as the first detection identifier.

In a possible implementation of the first aspect, the copied IFIT extension header includes a second detection identifier, the second detection identifier is different from the first detection identifier, and the second detection identifier includes the first detection identifier.

In a possible implementation of the first aspect, the first node receives configuration information, where the configuration information is used to indicate a copying mode. It may be learned that the first node may perform a corresponding operation based on the configuration information to copy the first detection identifier.

In a possible implementation of the first aspect, the method further includes that the first node collects statistics about first quantity information and first time information, where the first quantity information is a quantity of data packets in the multicast service flow that are received in a preset period, and the first time information is a timestamp of each data packet in the multicast service flow that is received at a time point in the preset period, and sends first detection information to the control node, where the first detection information includes one or more of the first quantity information, the first time information, an ingress identifier of the first node, and the first detection identifier, and the first detection information is used by the control node to perform packet loss detection or delay detection on the multicast service flow.

In a possible implementation of the first aspect, before sending, by the first node, the first detection information to the control node, the method further includes parsing a data packet in the multicast service flow to obtain a multicast source address and a multicast group address, where the first detection information further includes the multicast source address and the multicast group address.

The multicast source address and the multicast group address are used to enable the control node to know real information of the detected multicast service flow, and are used to prove authenticity of the detected multicast service flow.

In a possible implementation of the first aspect, the method further includes the first node that obtains second quantity information and second time information, where the second quantity information is a quantity of data packets encapsulated with the IFIT extension header in the multicast service flow that are sent in a preset period, and the second time information is a timestamp of each data packet encapsulated with the IFIT extension header in the multicast service flow that is sent at a time point in the preset period, and sends second detection information to the control node, where the second detection information includes one or more of the second quantity information, the second time information, the first detection identifier, and an egress identifier of the first node, and the second detection information is used by the control node to perform packet loss detection or delay detection on the multicast service flow.

Before performing performance detection on the multicast service flow, the control node may obtain a topology of the detection domain in advance. Therefore, the control node knows the ingress identifier and the egress identifier of the first node. In this embodiment of this application, the first detection identifier is used by the control node to identify the detected multicast service flow, the first quantity information and the second quantity information may be used by the control node to perform packet loss detection on the first node for the multicast service flow, the first time information and the second time information may be used by the control node to detect a delay of the multicast service flow on the first node, and the ingress identifier and the egress identifier of the first node are used by the control node to determine a location relationship of the first node.

According to a second aspect, an embodiment of this application provides a method for detecting a multicast service flow. The method includes a second node that receives a data packet encapsulated with an IFIT extension header that is sent by a previous-hop first node, where the IFIT extension header includes a first detection identifier, the first detection identifier is used to identify a detected multicast service flow to which the data packet belongs, and the first node is a head node in a multicast group, the second node copies, according to a quantity of next-hop third nodes of the second node, the data packet encapsulated with the IFIT extension header, and the second node sends the data packet encapsulated with the IFIT extension header to each next-hop node.

The second node is an intermediate node in a multicast detection domain. In this embodiment of this application, the second node copies the data packet encapsulated with the IFIT extension header that is received by the previous-hop node, and then sends the data packet to the next-hop node. Therefore, the data packet encapsulated with the IFIT extension header may be forwarded in the detection domain, and performance detection may be performed on the multicast service by using the IFIT.

In a possible implementation of the second aspect, a detection identifier in the copied IFIT extension header is the same as the first detection identifier.

In a possible implementation of the second aspect, the copied IFIT extension header includes a second detection identifier, the second detection identifier is different from the first detection identifier, and the second detection identifier includes the first detection identifier.

In a possible implementation of the second aspect, the first node receives configuration information, where the configuration information is used to indicate a copying mode. It may be learned that the first node may perform a corresponding operation based on the configuration information to copy the first detection identifier.

In a possible implementation of the second aspect, the method further includes that the second node obtains third quantity information and third time information, where the third quantity information is a quantity of data packets encapsulated with the IFIT extension header in the multicast service flow that are received in the preset period, and the third time information is a timestamp of each data packet encapsulated with the IFIT extension header in the received multicast service flow at a time point in the preset period, and sends the third detection information to the control node, where the third detection information includes one or more of third quantity information, third time information, the first detection identifier, and an ingress identifier of the second node, and the first detection information is used by the control node to perform packet loss detection or delay detection on the multicast service flow.

In a possible implementation of the second aspect, the method further includes the second node that obtains fourth quantity information and fourth time information, where the fourth quantity information is a quantity of data packets encapsulated with the IFIT extension header in the multicast service flow that are sent in the preset period, and the fourth time information is a timestamp of each data packet encapsulated with the IFIT extension header in the multicast service flow that is sent at a time point in the preset period, and sends fourth detection information to the control node, where the fourth detection information includes one or more of the fourth quantity information, the fourth time information, the first detection identifier, and an egress identifier of the second node, and the fourth detection information is used by the control node to perform packet loss detection or delay detection on the multicast service flow.

Before performing performance detection on the multicast service flow, the control node may obtain a topology of the detection domain in advance. Therefore, the control node knows the ingress identifier and the egress identifier of the second node. In this embodiment of this application, the first detection identifier is used by the control node to identify the multicast service flow, the third quantity information and the fourth quantity information may be used by the control node to perform packet loss detection of the multicast service flow on the second node, the third time information and the third time information may be used by the control node to detect a delay of the multicast service flow on the second node, and the ingress identifier and the egress identifier of the second node are used by the control node to determine a location relationship of the second node. In addition, the control node may perform packet loss detection and delay detection of the multicast service flow on a link with reference to the detection information sent by the first node and the detection information sent by the second node.

According to a third aspect, an embodiment of this application provides a multicast service flow detection apparatus, including a receiving unit configured to receive a multicast service flow sent by a multicast source, an encapsulation unit configured to encapsulate an IFIT extension header into a data packet in the multicast service flow, where the IFIT extension header includes a first detection identifier, and the first detection identifier is used to identify the detected multicast service flow, a copying unit configured to copy, according to a quantity of next-hop second nodes of the first node, the data packet encapsulated with the IFIT extension header, and a sending unit configured to send the data packet encapsulated with the IFIT extension header to each next-hop second node.

In a possible implementation of the third aspect, a detection identifier in the copied IFIT extension header is the same as the first detection identifier.

In a possible implementation of the third aspect, the copied IFIT extension header includes a second detection identifier, the second detection identifier is different from the first detection identifier, and the second detection identifier includes the first detection identifier.

In a possible implementation of the third aspect, the receiving unit is further configured to receive configuration information, where the configuration information is used to indicate a copying mode.

In a possible implementation of the third aspect, the apparatus further includes a first obtaining unit configured to obtain first quantity information and first time information, where the first quantity information is a quantity of data packets in the multicast service flow that are received in a preset period, and the first time information is a timestamp of each data packet in the multicast service flow that is received at a time point in the preset period, and a first sending unit configured to send first detection information to a control node, where the first detection information includes one or more of the first quantity information, the first time information, an ingress identifier of the first node, and the first detection identifier, and the first detection information is used by the control node to perform packet loss detection or delay detection on the multicast service flow.

In a possible implementation of the third aspect, before the sending unit sends the first detection information to the control node, the method further includes a parsing unit configured to parse a data packet in the multicast service flow to obtain a multicast source address and a multicast group address, where the first detection information further includes the multicast source address and the multicast group address.

In a possible implementation of the third aspect, the apparatus further includes a second obtaining unit configured to obtain second quantity information and second time information, where the second quantity information is a quantity of data packets encapsulated with the IFIT extension header in the multicast service flow that are sent in a preset period, and the second time information is a timestamp of each data packet encapsulated with the IFIT extension header in the multicast service flow that is sent at a time point in the preset period, and a second sending unit configured to send second detection information to the control node, where the second detection information includes one or more of the second quantity information, the second time information, the first detection identifier, and an egress identifier of the first node, and the second detection information is used by the control node to perform packet loss detection or delay detection on the multicast service flow.

According to a fourth aspect, an embodiment of this application provides a multicast service flow detection apparatus, including a receiving unit configured to receive a data packet encapsulated with an IFIT extension header that is sent by a previous-hop first node, where the IFIT extension header includes a first detection identifier, the first detection identifier is used to identify a detected multicast service flow to which the data packet belongs, and the first node is a head node in a multicast group, a copying unit configured to copy, according to a quantity of next-hop third nodes of the second node, the data packet encapsulated with the IFIT extension header, and a sending unit configured to send the data packet encapsulated with the IFIT extension header to each next-hop node.

In a possible implementation of the fourth aspect, a detection identifier in the copied IFIT extension header is the same as the first detection identifier.

In a possible implementation of the fourth aspect, the copied IFIT extension header includes a second detection identifier, the second detection identifier is different from the first detection identifier, and the second detection identifier includes the first detection identifier.

In a possible implementation of the fourth aspect, the receiving unit is further configured to receive configuration information, where the configuration information is used to indicate a copying mode.

In a possible implementation of the fourth aspect, the apparatus further includes a first obtaining unit configured to obtain third quantity information and third time information, where the third quantity information is a quantity of data packets encapsulated with the IFIT extension header in the multicast service flow that are received in a preset period, and the third time information is a timestamp of each data packet encapsulated with the IFIT extension header in the multicast service flow that is received at a time point in the preset period, and a first sending unit configured to send third detection information to a control node, where the third detection information includes one or more of the third quantity information, the third time information, the first detection identifier, and an ingress identifier of the second node, and the third detection information is used by the control node to perform packet loss detection or delay detection on the multicast service flow.

In a possible implementation of the fourth aspect, the apparatus further includes a second obtaining unit configured to obtain fourth quantity information and fourth time information, where the fourth quantity information is a quantity of data packets encapsulated with the IFIT extension header in the multicast service flow that are sent in a preset period, and the fourth time information is a timestamp of each data packet encapsulated with the IFIT extension header in the multicast service flow that is sent at a time point in the preset period, and a second sending unit configured to send fourth detection information to the control node, where the fourth detection information includes one or more of the fourth quantity information, the fourth time information, the first detection identifier, and an egress identifier of the second node, and the fourth detection information is used by the control node to perform packet loss detection or delay detection on the multicast service flow.

According to a fifth aspect, an embodiment of this application provides an apparatus for detecting a multicast service flow, including a receiving unit configured to receive a data packet encapsulated with an IFIT extension header that is sent by a previous-hop second node, where the IFIT extension header includes a first detection identifier, the first detection identifier is used to uniquely identify a multicast service flow to which the data packet belongs, the first node is a head node in a multicast group, a decapsulation unit configured to decapsulate the data packet encapsulated with the IFIT extension header to obtain the data packet, a copying unit configured to copy a data packet according to a quantity of next-hop receive ends of the third node, and a sending unit configured to send the data packet to each next-hop receive end.

In a possible implementation of the fifth aspect, the apparatus further includes a first obtaining unit configured to obtain fifth quantity information and fifth time information, where the fifth quantity information is a quantity of data packets encapsulated with the IFIT extension header in the multicast service flow that are received in a preset period, and the fifth time information is a timestamp of each data packet encapsulated with the IFIT extension header in the multicast service flow that is received in the preset period, and a first sending unit configured to send fifth detection information to a control node, where the fifth detection information includes one or more of the fifth quantity information, the fifth time information, the first detection identifier, and an ingress identifier of a third node, and the fifth detection information packet is used by the control node to perform packet loss detection or delay detection on the multicast service flow.

In a possible implementation of the fifth aspect, the apparatus further includes a second obtaining unit configured to obtain sixth quantity information and sixth time information, where the sixth quantity information is a quantity of data packets sent in a preset period, and the sixth time information is a timestamp of each data packet sent in the preset period, and a second sending unit configured to send sixth detection information to the control node, where the sixth detection information includes one or more of the sixth quantity information, the sixth time information, the first detection identifier, and an egress identifier of the third node, and the sixth detection information is used by the control node to perform packet loss detection or delay detection on the multicast service flow.

According to a sixth aspect, an embodiment of this application provides a device for detecting a multicast service flow, where the detection device includes at least one processor and a communication interface, the communication interface is configured to send and/or receive data, and the at least one processor is configured to invoke a computer program stored in the at least one memory, so that the detection device implements the method according to any one of the first aspect or the possible implementations of the first aspect, or any one of the second aspect or the possible implementations of the second aspect, or any one of the third aspect or the possible implementations of the third aspect.

According to a seventh aspect, an embodiment of this application provides a system for detecting a multicast service flow. The detection system includes a first node, a second node, and a third node, where the first node is the apparatus according to any one of the third aspect or the possible implementations of the third aspect, the second node is the apparatus according to any one of the fourth aspect or the possible implementations of the fourth aspect, and the third node is the apparatus according to any one of the fifth aspect or the possible implementations of the fifth aspect.

According to an eighth aspect, an embodiment of this application provides a computer-readable storage medium. The computer-readable storage medium stores a computer program, and when the computer program is run on one or more processors, the method according to any one of the first aspect or the possible implementations of the first aspect is performed.

According to a ninth aspect, an embodiment of this application provides a computer-readable storage medium. The computer-readable storage medium stores a computer program, and when the computer program is run on one or more processors, the method according to any one of the second aspect or the possible implementations of the second aspect is performed.

According to a tenth aspect, an embodiment of this application provides a computer program product, where when the computer program product runs on one or more processors, the method according to any one of the first aspect or the possible implementations of the first aspect is performed.

According to an eleventh aspect, an embodiment of this application provides a computer program product, where when the computer program product runs on one or more processors, the method according to any one of the second aspect or the possible implementations of the second aspect is performed.

According to a twelfth aspect, an embodiment of this application provides a chip system. The chip system includes at least one processor, a memory, and an interface circuit. The interface circuit is configured to provide an information input/output for the at least one processor. The memory stores a computer program, and when the computer program is run on one or more processors, the method according to any one of the first aspect or the possible implementations of the first aspect is performed.

According to a thirteenth aspect, an embodiment of this application provides a chip system. The chip system includes at least one processor, a memory, and an interface circuit. The interface circuit is configured to provide an information input/output for the at least one processor. The memory stores a computer program, and when the computer program is run on one or more processors, the method according to any one of the second aspect or the possible implementations of the second aspect is performed.

BRIEF DESCRIPTION OF DRAWINGS

The following describes accompanying drawings used in embodiments of this application.

FIG. 1 is a schematic diagram of an encapsulation format of an IFIT extension header according to an embodiment of this application.

DESCRIPTION OF EMBODIMENTS

The following clearly describes technical solutions in embodiments of this application in detail with reference to the accompanying drawings. In descriptions of embodiments of this application, unless otherwise stated, "I" indicates or, for example, A/B may indicate A or B. "Or" in the text is merely an association relationship that describes an associated object, and indicates that three relationships may exist. For example, A or B may indicate that there are three cases: only A exists, both A and B exist, and only B exists. In addition, in the descriptions of embodiments of this application, "a plurality of" means two or more.

The following terms "first" and "second" are merely intended for descriptive purposes, and shall not be understood as an indication or implication of relative importance or an implicit indication of a quantity of indicated technical features. Therefore, features defined with "first" and "second" may explicitly or implicitly include one or more of such features. In the descriptions of embodiments of this application, unless otherwise stated, "a plurality of" means two or more.

The following first briefly describes related technologies and technical terms in this application for ease of understanding.

IFIT:

The IFIT detection technology is an in-situ flow detection technology that is based on Request for Comments (RFC) 8321 (Alternate-Marking Method for Passive and Hybrid Performance Monitoring) and can mark (color) actual service flows and perform packet loss detection and delay detection based on feature fields.

The IFIT performs in-situ flow detection, and requires an actual service packet to carry information about an IFIT detection header. An in-situ flow node performs performance measurement based on the IFIT extension header. FIG. 1 is a schematic diagram of an encapsulation format of a core part of an IFIT extension header. A flow ID, for example, bit0 to bit19, is used to identify a service flow that carries the first detection identifier, and the flow identifier (ID) needs to be unique in the detection domain in an entire network. An Internet Protocol (IP)-based radio access network (IPRAN) network element can identify flows based on flow IDs. L Flag: Loss flag, which is a coloring flag for packet loss measurement. D Flag: Delay flag, which is a coloring flag for delay measurement, and the value 1 indicates that delay measurement is required, and the value 0 indicates that delay measurement is not required.

Figure 2A:
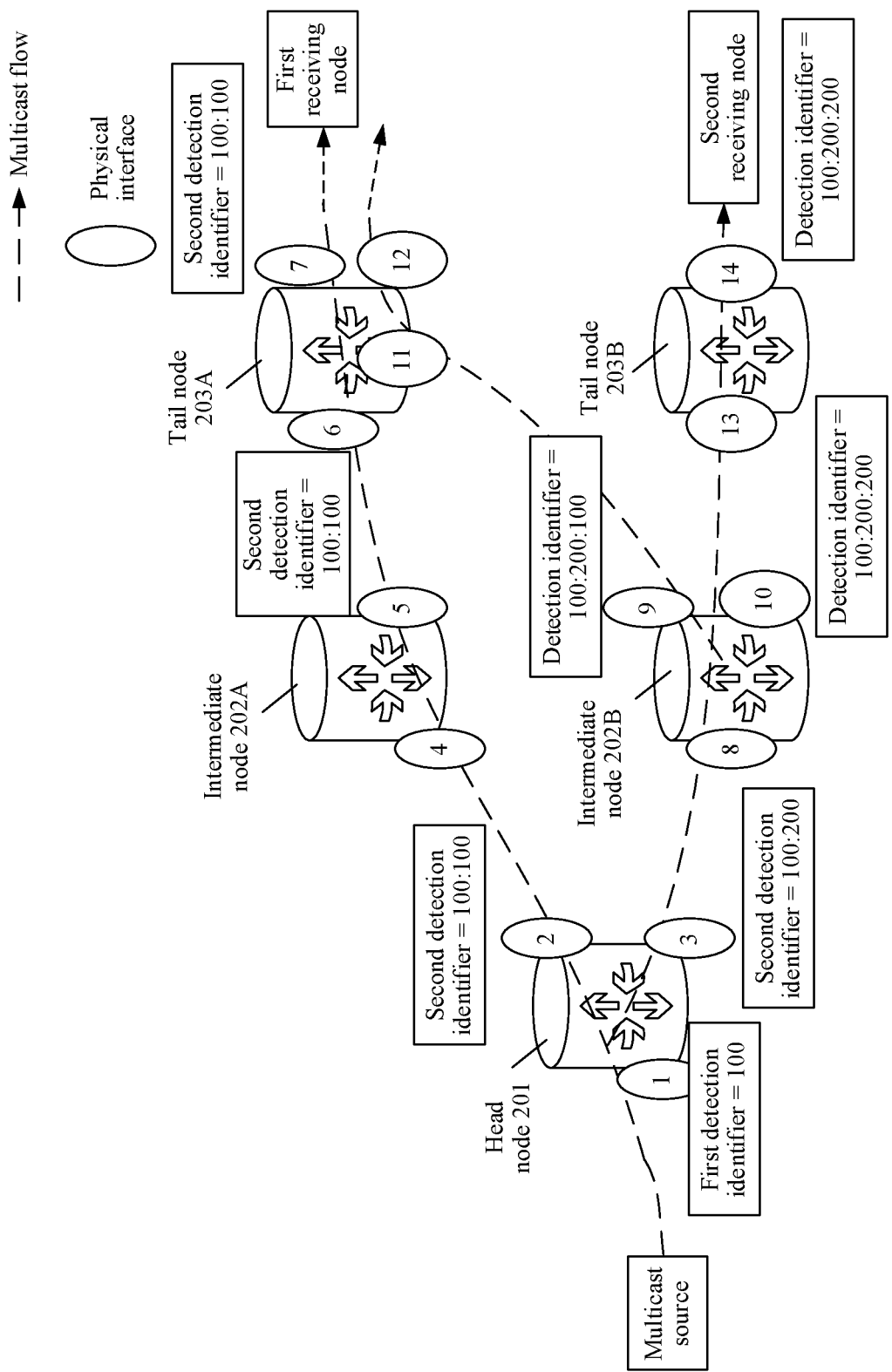
FIG. 2A is a schematic diagram of a scenario of a method for detecting a multicast service flow according to an embodiment of this application.

An embodiment (referred to as solution 1) of this application is shown in FIG. 2A. It can be learned from FIG. 2A that a head node 201 receives a data packet in a multicast service flow sent by a multicast source, an ingress 1 of the head node 201 identifies the data packet, generates a first detection identifier 100 based on the data packet, encapsulates the first detection identifier 100 into an IFIT extension header, and then encapsulates the IFIT extension header into the data packet. It should be noted that the multicast service flow includes one or more multicast packets, an IFIT extension header is encapsulated in each multicast packet, and the first detection identifier 100 is used to identify a multicast service flow that carries the first detection identifier.

In a downstream direction of the head node 201, the data packet encapsulated with the IFIT extension header needs to be copied for multicast. Generally, corresponding copying needs to be performed according to a quantity of next-hop nodes of the head node 201. It can be learned from FIG. 2A that the next-hop nodes of the head node 201 include an intermediate node 202A and an intermediate node 202B. Therefore, the head node 201 needs to make two copies of data packets encapsulated with the IFIT extension header. A second detection identifier 100:100 and a second detection identifier 100:200 are generated for the first detection identifier 100 encapsulated in the data packet, then the first detection identifier 100 inserted into the data packet is replaced with the second detection identifier 100:100 and the second detection identifier 100:200, and finally, an egress 2 and an egress 3 of the head node 201 forward the updated data packet.

An ingress 1 of the head node 201 sends a detection result of a multicast service and the first detection identifier 100 to a control node (not shown in the figure), the egress 2 of the head node 201 sends the detection result of the multicast service and the second detection identifier 100:100 to the control node (not shown in the figure), and the egress 3 of the head node 201 sends the detection result of the data packet and the second detection identifier 100:200 to the control node (not shown in the figure). The detection result sent by the ingress 1 of the head node may be a quantity and timestamps of data packets received according to a preset period. The detection result sent by the egress 2 of the head node may be a quantity and timestamps of data packets encapsulated with the second detection identifier 100:100 that are sent according to the preset period. The detection result sent by the egress 3 of the head node may be a quantity and timestamps of data packets encapsulated with the second detection identifier 100:200 that are sent according to the preset period. The control node (not shown in the figure) receives information sent by the head node 201. Because the sent information includes the first detection identifier 100, the control node (not shown in the figure) may identify that the reported information is a multicast service flow carrying the same first detection identifier 100, and may perform hop-by-hop packet loss detection on the multicast service flow, which is {the detection result of the ingress 1–the detection result of the ingress 2 or the detection result of the ingress 1–the detection result of the ingress 3}.

The intermediate node and the tail node copy, update, and forward the received data packet in a same manner, and also send the detection result and the first detection identifier to the control node (not shown in the figure). The information sent to the control node includes the first detection identifier 100. The control node may consider that the detection results reported by the head node, the intermediate node, and the tail node belong to the service flow that carries the same first detection identifier 100. Therefore, link packet loss detection may be performed on the multicast service flow that carries the first detection identifier 100.

Figure 2B:
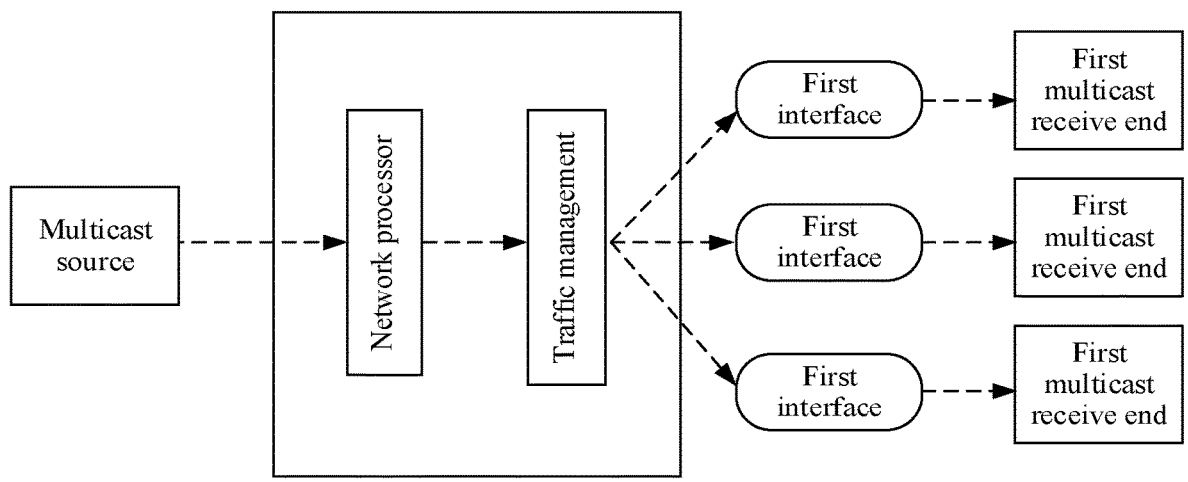
FIG. 2B is a schematic diagram of a structure of a node according to an embodiment of this application.

FIG. 2B is a schematic diagram of a structure of a node according to an embodiment of this application. It can be seen from FIG. 2B that the node includes a network processor (NP) chip and a traffic management (TM) chip. Generally, an operation of generating a first detection identifier for a data packet in a multicast service flow and encapsulating the first detection identifier in an IFIT extension header needs to be completed by a high-performance processing chip, and is implemented by the NP chip in most cases, and an operation of copying the data packet encapsulated with the IFIT extension header is completed by the TM chip. However, for a scenario diagram shown in FIG. 2A, the TM chip needs to edit an IFIT extension header for a packet copied by the TM chip. That is, the TM chip performs an editing operation on the first detection identifier in the IFIT extension header encapsulated in the data packet copied by the TM chip, to generate an identifier that is different from the original first detection identifier. Because processing performance of the TM chip is not strong, it is relatively difficult to re-edit the first detection identifier. Therefore, currently, it is difficult to implement a method for detecting a multicast service flow provided in FIG. 2A.

Another embodiment (referred to as solution 2) of this application provides a method and a related apparatus for detecting a multicast service flow. The method includes the following steps.

A first node receives a multicast service flow sent by a multicast source, and the first node encapsulates an IFIT extension header into a data packet in the multicast service flow. For example, before the first node encapsulates the IFIT extension header into the data packet, the first node identifies the multicast service flow (for example, identifies the multicast service flow by using (S-multicast source, G-multicast group) in the multicast packet) and generates a first detection identifier, and then inserts the first detection identifier into the IFIT extension header, where the first detection identifier is used to uniquely identify the detected multicast service flow, and there are one or more data packets in the detected multicast service flow. That is, the first detection identifier identifies a multicast flow in a multicast detection domain. The first node copies, according to a quantity of next-hop second nodes, the data packet encapsulated with the IFIT extension header, where a detection identifier in the copied IFIT extension header is the same as the first detection identifier, and then sends the data packet encapsulated with the IFIT extension header to each next-hop second node. The first node is a head node in the multicast detection domain. In this embodiment of this application, a node that first receives a to-be-measured service flow sent by a multicast source in the multicast detection domain is defined as a head node.

The second node receives the data packet encapsulated with the IFIT extension header that is sent by the previous-hop first node. The second node copies, according to a quantity of third nodes of a next-hop node of the second node, the data packet encapsulated with the IFIT extension header, and then sends the data packet encapsulated with the IFIT extension header to each next-hop node. The second node is an intermediate node in the multicast detection domain.

The third node receives the data packet encapsulated with the IFIT extension header that is sent by the previous-hop second node, and decapsulates the data packet from the data packet encapsulated with the IFIT extension header. Then, the third node copies the data packet according to a quantity of next-hop receive ends of the third node, and sends the data packet to each next-hop receive end. The third node is a tail node in the multicast detection domain.

In this embodiment, the first detection identifier is the same before and after each copying. For example, the first detection identifier in the IFIT extension header encapsulated by the first node is 100, and the first detection identifier in the data packet encapsulated with the IFIT extension header that is copied by the first node is still 100. Similarly, the first detection identifier in the data packet encapsulated with the IFIT extension header that is copied by the second node is also 100.

A node in the multicast detection domain further sends detection information to a control node, where the detection information sent by an ingress of the node to the control node includes an ingress identifier, a first detection identifier, a quantity of data packets received in a preset period, and a timestamp of each data packet received in the preset period, and the detection information sent by an egress of the node to the control node includes an egress identifier, the first detection identifier, the quantity of data packets sent in the preset period, and a timestamp of each data packet sent in the preset period.

If the detection information sent by the node in the multicast detection domain and received by the control node includes a same first detection identifier, it may be considered that the detection information indicates a same service flow, and packet loss detection or delay detection may be performed according to the detection information.

Compared with the solution in FIG. 2A, in this embodiment of this application, the TM does not need to edit the first detection identifier in the IFIT extension header for the copied packet. Therefore, the technical solution in this embodiment of this application can be easily implemented on an existing TM.

In the foregoing two solutions, two copying modes are mentioned. In the copying mode in solution 1, the detection identifier in the copied IFIT extension header is the same as the detection identifier in the original IFIT extension header. In the copying mode in solution 2, the detection identifier in the copied IFIT extension header is different from the detection identifier in the original IFIT extension header. In implementation, when a device (a head node or an intermediate node) is running, the device may be configured to run in the mode in solution 1 or solution 2, or the copying mode of the device may be set to a fixed value when the device is delivered.

The following describes a system architecture provided in an embodiment of this application. It should be noted that the system architecture described in this application is intended to describe the technical solutions in this application more clearly, and does not constitute a limitation on the technical solutions provided in this application. A person skilled in the art may know that, with evolution of the system architecture, the counting solutions provided in this application are also applicable to similar technical problems.

Figure 3:
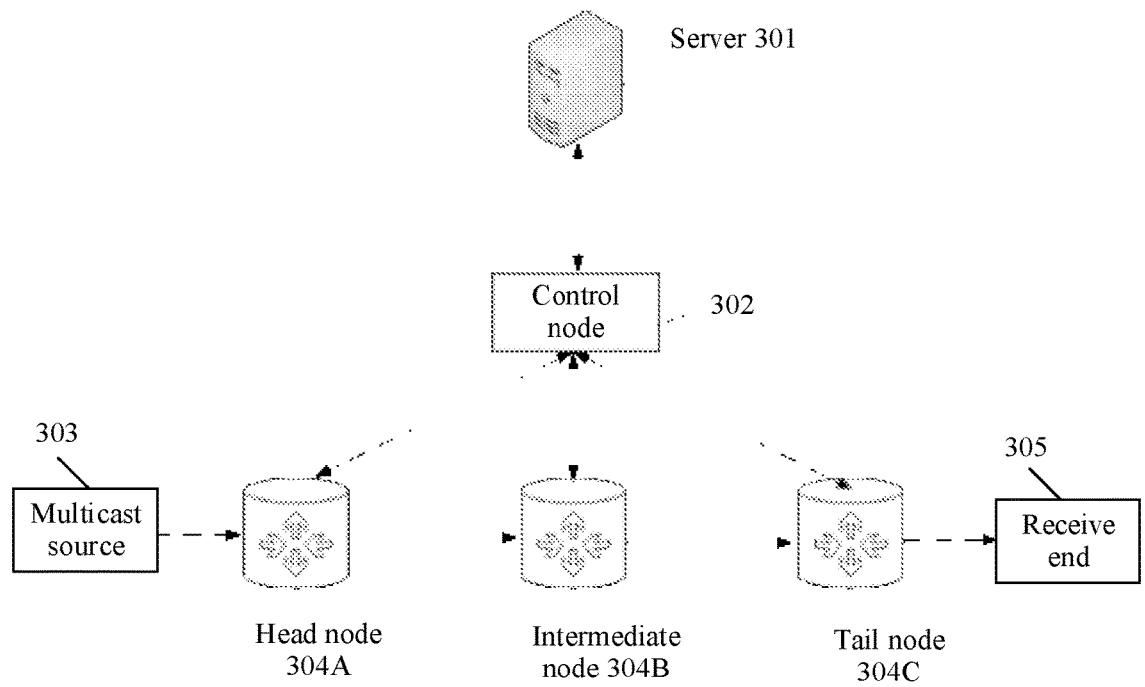
FIG. 3 is a schematic diagram of a system architecture of a multicast detection domain according to an embodiment of this application.

FIG. 3 is a schematic diagram of a system architecture of a multicast detection domain according to an embodiment of this application. The system architecture of the multicast detection domain includes a server 301, a control node 302, a multicast source 303, a head node 304A, an intermediate node 304B, a tail node 304C, and a receive end 305.

The server 301 is used as a physical device for deploying the control node 302. A server is a device that provides a computing service. The server needs to respond to a service request and process a responded service. Therefore, the server is generally capable of providing and ensuring services. For example, the server analyzes and processes service information received by the control node to obtain a packet loss status and a delay status of the multicast detection domain.

The server 301 includes a processor, a hard disk, a memory, a system bus, and the like, and has an architecture similar to an architecture of a general-purpose computer. However, because the server 301 is required to provide reliable services, there are high requirements on a processing capability, stability, reliability, security, scalability, manageability, and the like of the server 301.

Generally, the server 301 may be an x86 server, which is also referred to as a server with a Complex Instruction Set Computing (CISC) architecture, that is, a personal computer (PC) server. The x86server is a server that is based on a PC architecture, uses an INTEL processor chip or another processor chip that is compatible with x86 instruction sets, and runs a WINDOWS operating system. The x86 server is cost-effective, compatible, and unstable, and is mainly used in small- and medium-sized enterprises and non-critical services.

The control node 302 has functions such as network management, service control, and network analysis, and is a core enabling system for implementing network resource pooling, network connection automation, and operation and maintenance automation. The control node 302 is mainly used to perform data collection and performance detection on a service packet on a transmission path between nodes in the multicast detection domain, where the performance detection includes packet loss detection and delay detection. The control node 302 may determine a control domain, obtain a topology structure diagram of a multicast detection domain in the control domain, and determine an ingress identifier and an egress identifier of a head node, an ingress identifier and an egress identifier of an intermediate node, and an ingress identifier and an egress identifier of a tail node on a to-be-detected transmission path according to the topology structure diagram.

The multicast source 303 is a node configured to send a multicast service flow to a multicast group in the multicast detection domain. In the multicast detection domain, the multicast source sends information only once, and a node in the multicast detection domain establishes a route for a multicast service flow by using a multicast routing protocol. The transmitted information starts to be copied and distributed at a branch as far as possible, and all node members in the multicast group can receive a data packet in the multicast service flow. The multicast group includes the head node 304A, the intermediate node 304B, and the tail node 304C. It should be noted that the multicast source may not belong to a multicast group. The multicast source sends data to a multicast group, but the multicast source may not be a receiver. A plurality of multicast sources may send packets to one multicast group at the same time. FIG. 3 shows only one multicast source.

It should be noted that, although FIG. 3 shows only one head node 304A, one intermediate node 304B, and one tail node 304C, nodes in the multicast group may include a plurality of head nodes, a plurality of intermediate nodes, and a plurality of tail nodes.

The head node 304A is the first node that receives the data packet in the multicast service flow in the multicast detection domain, and is configured to receive the data packet sent by the multicast source 303, generate a first detection identifier according to the data packet, encapsulate the first detection identifier into an IFIT extension header, encapsulate the IFIT extension header into the data packet, and copy and forward the copied data packet encapsulated with the IFIT extension header, where a detection identifier in the copied IFIT extension header is the same as the first detection identifier. The head node 304A is further configured to collect statistics about detection information of an incoming service flow, and upload the detection information to the control node 302.

The intermediate node 304B is configured to receive the data packet encapsulated with the IFIT extension header that is sent by the head node, copy the data packet, and forward the data packet, where the detection identifier in the copied IFIT extension header is the same as the first detection identifier. The intermediate node 304B is further configured to collect statistics about the detection information of the incoming multicast service flow, and upload the detection information to the control node 302.

The tail node 304C is configured to receive the data packet encapsulated with the IFIT extension header that is sent by the intermediate node, copy the data packet, and decapsulate the data packet from the data packet encapsulated with the IFIT extension header. The tail node 304C is further configured to collect statistics about the detection information of the incoming service flow, and upload the detection information to the control node 302.

It should be noted that the detection information collected by the head node, the intermediate node, and the tail node includes one or more of an ingress identifier and an egress identifier of each node, a quantity and timestamps of data packets that are received and sent by each node, a first detection identifier, a multicast source address, a multicast group address, a multicast source port, a receive end port, and a multicast protocol number.

The receive end 305 is configured to receive the data packet sent by the tail node 304C. It should be noted that the receive end 205 may also join a multicast group including the head node 304A, the intermediate node 304B, and the tail node 304C.

It should be noted that, in a multicast manner, a sender of information is a "multicast source", and a receiver of information is a "multicast group" of the information.

It should be noted that the node mentioned in this embodiment of this application is an electronic device having data receiving and sending functions. In a specific implementation process, the head node 304A, the intermediate node 304B, and the tail node 304C may be data forwarding devices, for example, a router, a repeater, a bridge, or a switch. The receiving node 205 may be a terminal device, for example, various types of user equipment (UE), a mobile phone, a tablet computer (IPAD), a desktop computer, a headset, a speaker, or a television.

Figure 4:
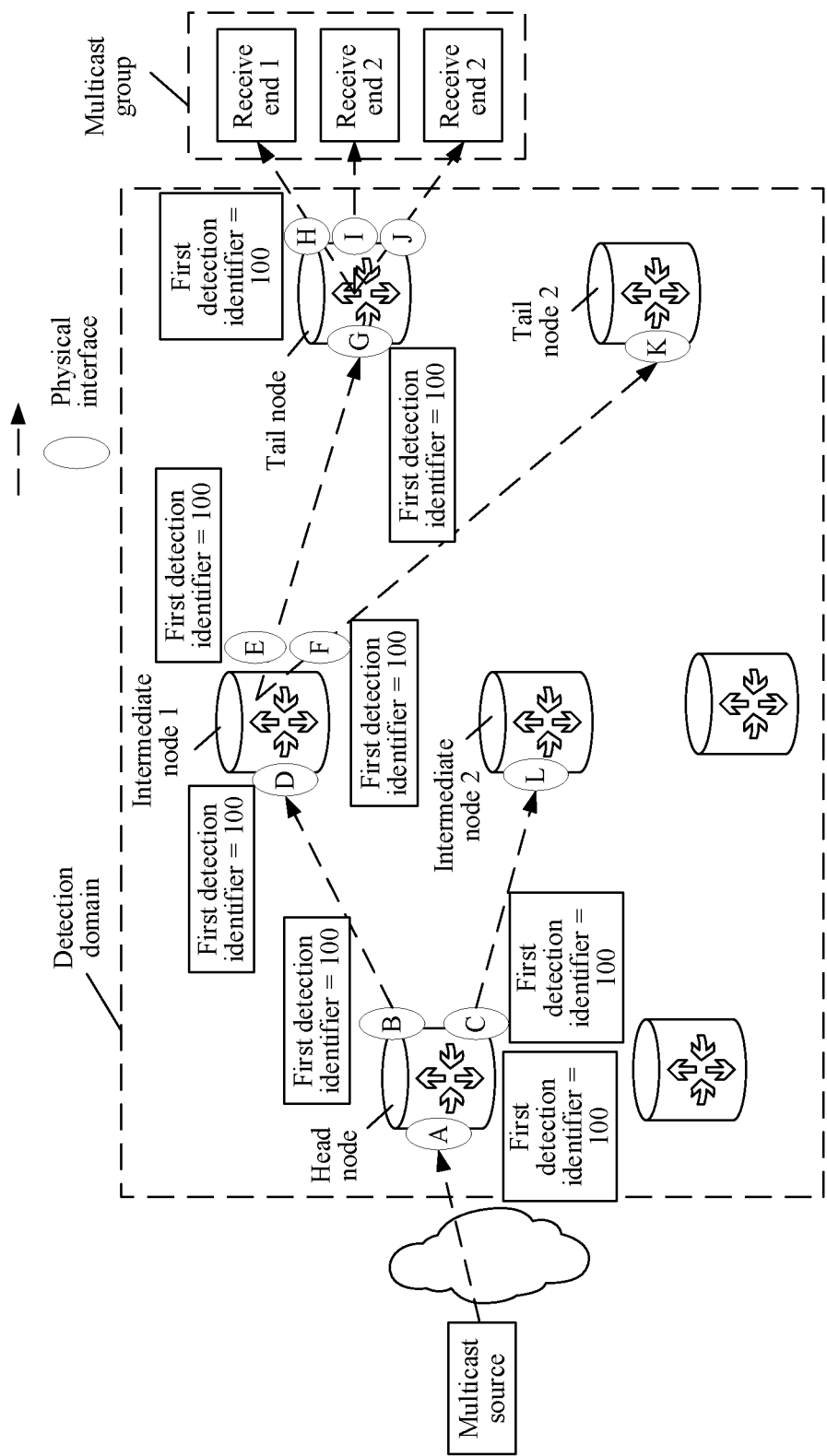
FIG. 4 is a schematic diagram of a transmission path of a multicast service flow according to an embodiment of this application.

FIG. 4 is a schematic diagram of a transmission path of a multicast service flow according to an embodiment of this application. The schematic diagram includes a control node and a plurality of network nodes. The plurality of network nodes is connected by using communication links, to transmit a multicast service flow. As shown in FIG. 3A, a multicast source, a head node, an intermediate node 1, an intermediate node 2, a tail node, and a multicast group are sequentially connected by using communication links, and the multicast group includes a receive end 1, a receive end 2, and a receive end 3. The multicast service flow may reach the multicast group from the multicast source through the head node, the intermediate node 1, and the tail node, and any receive end in the multicast group may receive the multicast service flow.

The control node may collect information about data packets on a transmission path between the plurality of network nodes and perform performance detection on the transmission path, where the performance detection includes packet loss detection and delay detection. The packet loss detection includes end-to-end (E2E) packet loss detection and hop-by-hop packet loss detection. The delay detection includes E2E delay detection and hop-by-hop packet loss detection. In this embodiment of this application, the transmission path may include a path through which the multicast service flow passes.

The control node may determine a detection domain, and the detection domain is a detection range determined by the control node. In a possible implementation, a network engineer sends device information of a to-be-detected transmission path to the control node by using a network management device or user equipment, where the device information includes a device identifier of a head node device identifier and a tail node device identifier of the to-be-detected data path. For example, a network engineer requires that a transmission path between a first network device and a second network device needs be detected. The network engineer sends the device identifier of the first network device and the device identifier of the second network device to the control node by using a network management device or user equipment. After receiving the device identifier of the first network device and the device identifier of the second network device, the control node uses the first network device as the head node device of the to-be-detected transmission path and uses the second network device as the tail node on the to-be-detected transmission path, to determine the detection domain. The control node may receive the device information by using, for example, a northbound interface (NBI).

In another possible implementation, the control node determines a head node device identifier and a tail node device identifier of a to-be-detected transmission path according to a predetermined multicast policy. The control node may obtain a topology of a plurality of network nodes in the multicast detection domain, so that the control node may determine the head node device identifier and the tail node device identifier of the to-be-detected transmission path based on the topology of the plurality of network nodes. For example, the predetermined multicast policy is to perform detection information collection and performance detection on a transmission path between forwarding nodes included in a data center (DC). The control node determines the head node device identifier and the tail node device identifier of the to-be-detected transmission path based on a topology of the DC.

In another possible implementation, the controller node may determine the to-be-detected head node device based on the multicast source address of the data packet in the multicast service flow, and determine the to-be-detected tail node device based on the destination address of the data packet, so as to determine the detection domain.

On the transmission path in the detection domain, a next-hop node of the head node may be an intermediate node, and a previous-hop node of the tail node may also be an intermediate node, for example, an intermediate node 1 and an intermediate node 2 in FIG. 3.

The control node sends information carrying a head node identifier to the head node determined by the control node, where the head node identifier may be identified by using a device identifier of the head node, an IP address of the head node, or the like. After receiving the head node identifier, the head node may determine itself as the head node according to the head node identifier. Therefore, when receiving a multicast service flow, the head node may identify the multicast service flow, generate the first detection identifier 100 for the multicast service flow, insert the first detection identifier 100 into an IFIT extension header, and encapsulate the IFIT extension header into each data packet in the multicast service flow.

The control node sends, to the tail node determined by the control node, information carrying a tail node identifier, where the tail node identifier may be identified by using a device identifier of the tail node, an IP address of the tail node, or the like. After receiving the tail node identifier, the tail node may determine itself as the tail node according to the tail node identifier. In this way, after receiving the multicast service flow, the tail receiver may decapsulate the data packet from the data packet encapsulated with the IFIT extension header.

In the detection domain shown in FIG. 4, an egress B of a head node, an ingress D of an intermediate node 1, an egress E of the intermediate node 1, and an ingress G of a tail node 1 communicate with each other by using one transmission path, and an egress B of the head node, an ingress D of the intermediate node 1, an egress F of the intermediate node 1, and an ingress K of a tail node 2 communicate with each other by using one transmission path. When receiving a multicast service flow, the head node obtains, through copying, two copies of a data packet encapsulated with the IFIT extension header, where a detection identifier in the copied IFIT extension header is the same as the first detection identifier 100. One copy of the data packet is sent from the egress B of the head node to the ingress D of the intermediate node 1, and the other copy of the data packet is sent from the egress C of the head node to the ingress L of the intermediate node 2. After receiving the data packet encapsulated with the IFIT extension header that is sent by the egress B of the head node, the intermediate node 1 obtains, through copying, two copies of the data packet encapsulated with the IFIT extension header, where a detection identifier in the copied IFIT extension header is the same as the first detection identifier. One copy of the data packet is sent from the egress E of the intermediate node to the ingress G of the tail node 1, and the other copy is sent from the egress F of the intermediate node to the ingress K of the tail node 2. After receiving the data packet encapsulated with the IFIT extension header, the tail node decapsulates the data packet encapsulated with the IFIT extension header to obtain the data packet, and obtains, through copying, three copies of the data packet, sends one copy of the data packet to the node 1 in the multicast group from the egress H of the tail node 1, sends one copy of the data packet to the node 2 in the multicast group from the egress I of the tail node 1, and sends one copy of the data packet to the node 3 in the multicast group from the egress J of the tail node 1. It should be noted that a topology structure of a plurality of nodes in the detection domain shown in FIG. 4 is an example. This is not limited in this embodiment of this application.

Each network node in the detection domain may send detection information to the control node. The detection information sent by an ingress of each node in the detection domain includes an ingress identifier of each node, the first detection identifier, the quantity and a timestamp of each data packet in the multicast service flow that is received in a preset period. The detection information sent by an egress of each node in the detection domain includes an egress identifier of each node, the first detection identifier, the quantity and timestamp of data packets in the multicast service flow that are sent in the preset period. The detection information may further include a multicast source address and a multicast group address that are obtained, by parsing the data packet, by a node in the detection domain. The multicast source address and the multicast group address are used by the control node to determine real information of the detected service flow.

It should be noted that, in this embodiment of this application, the term "device" and the term "node" may be used interchangeably. For example, the control node may be referred to as a control device, the head node may be referred to as a head device, the intermediate node may be referred to as an intermediate device, and the tail node may be referred to as a tail device.

It should be noted that, in this embodiment of this application, there is at least one data packet in the multicast service flow, and an IFIT extension header is encapsulated into each data packet in the multicast service flow, where the IFIT extension header includes the first detection identifier. That is, the first detection identifier may be carried in each copied data packet.

Figure 5A:
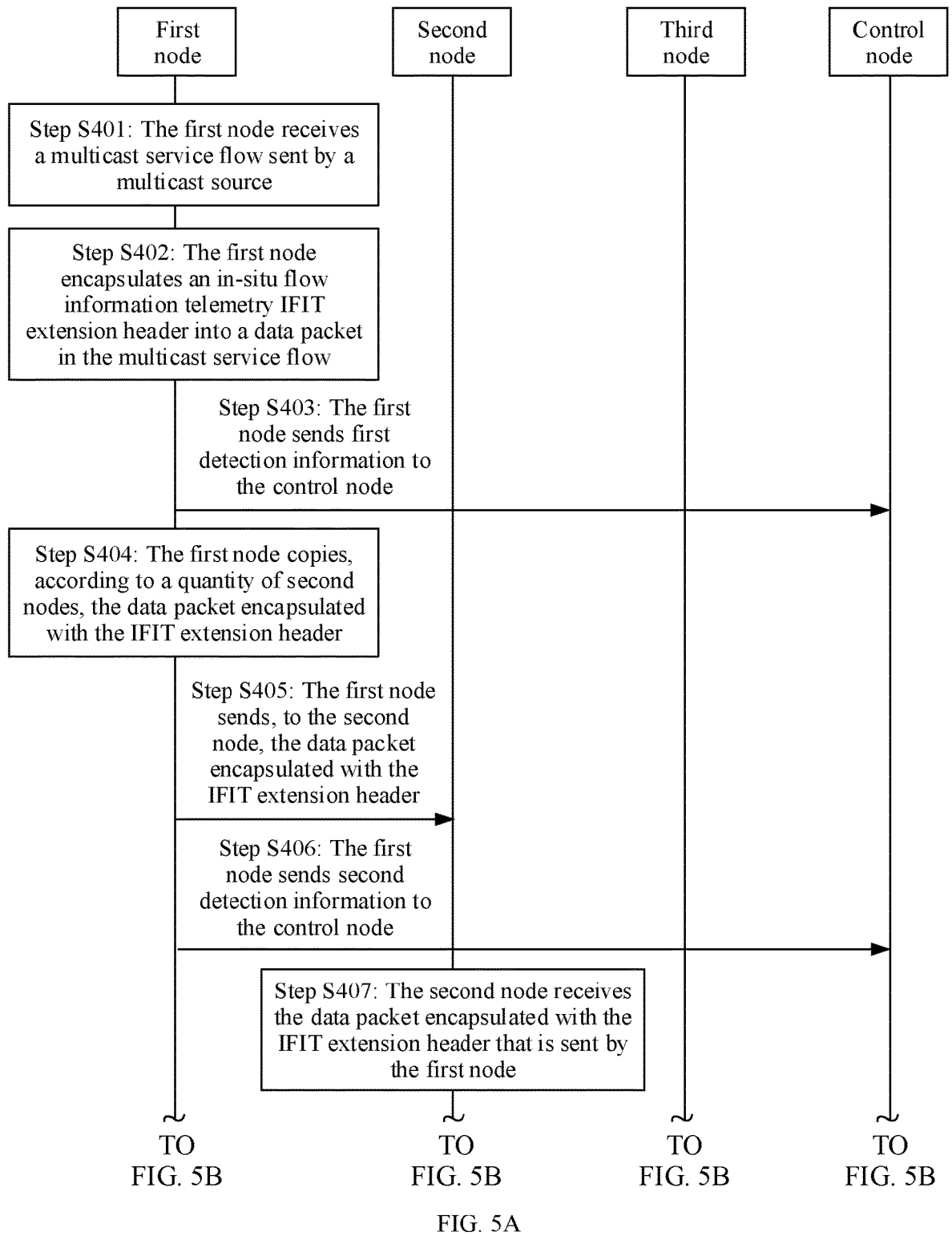
FIG. 5A, FIG. 5B, and FIG. 5C are a schematic flowchart of a method for detecting a multicast service flow according to an embodiment of this application.
Figure 5B:
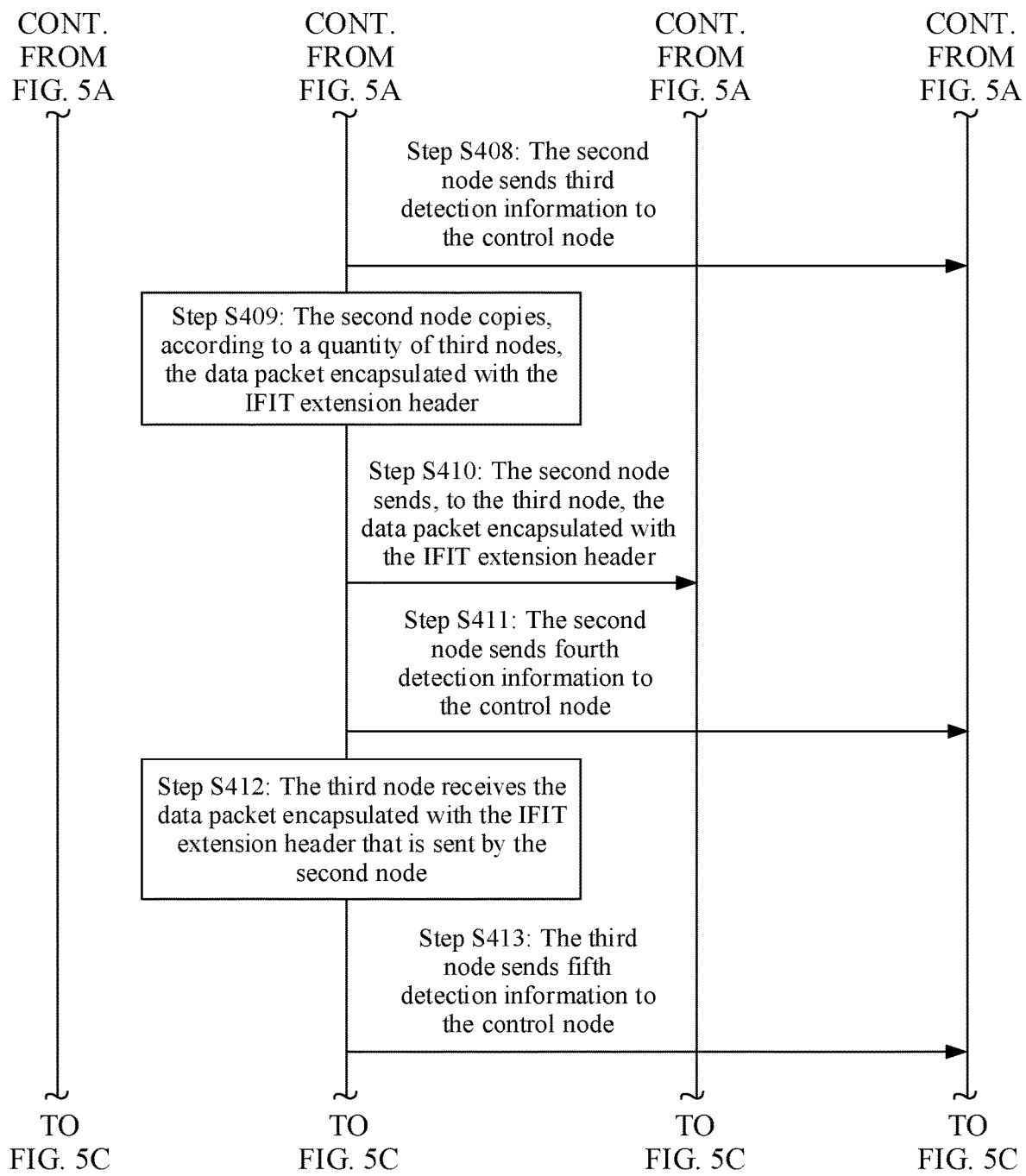
Figure 5C:
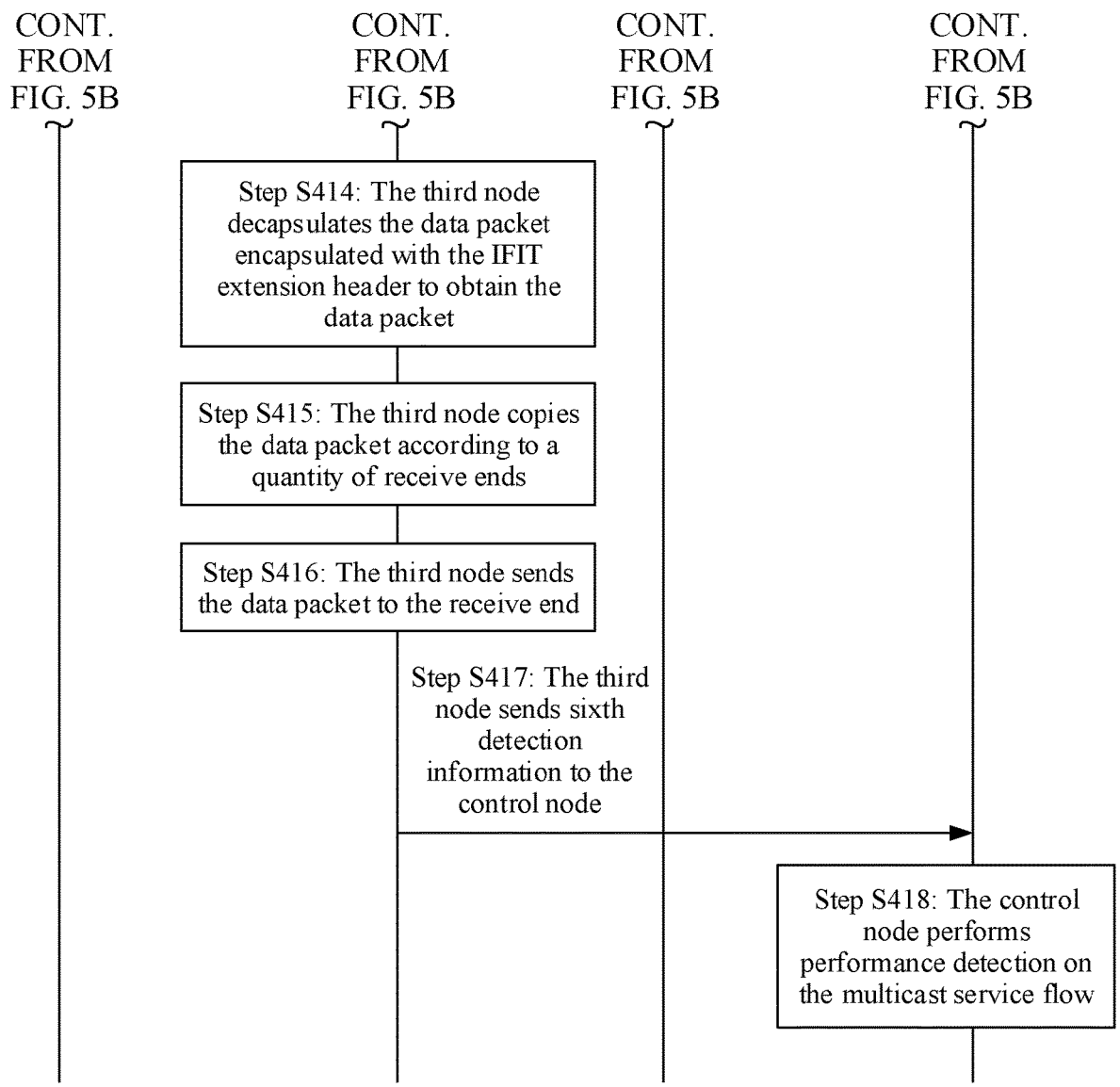

FIG. 5A to FIG. 5C are a schematic flowchart of a method for detecting a multicast service flow according to an embodiment of this application. The method includes but is not limited to the following steps.

Step S401: A first node receives a multicast service flow sent by a multicast source.

Further, multicast is to send a data packet to a determined node set (that is, a multicast group) in a multicast detection domain in a best-effort transmission manner. A basic idea of multicast provided in this embodiment of this application is as follows. In a multicast environment, a multicast source sends only one multicast service flow, and the multicast service flow generated by the multicast source has a group of destination addresses rather than one destination address, so as to form a group address. All receive ends in the multicast group can receive the same copy of the data packet in the multicast service flow. The multicast service flow sent by the multicast source may be a video stream.

Protocols used in the multicast detection domain include a multicast group management protocol and a multicast routing protocol. The used multicast group management protocol is the Internet Multicast Management Protocol (IGMP), which is a basic signaling protocol for IP multicast. The multicast group management protocol mainly runs between a multicast group and nodes in a multicast detection domain, so that the nodes in the network know whether there is a multicast group member on a network segment. The multicast routing protocol is used between multicast nodes to establish and maintain a multicast route and correctly and efficiently forwards a multicast service flow. The used multicast routing protocols include Protocol-Independent Multicast (PIM)-Sparse-Mode (SM), PIM-Dense Mode (DM), Multicast Source Discovery Protocol (MSDP), and the like.

A loop-free data transmission path from a multicast source to a plurality of receive ends in a multicast group may be established by using a multicast routing protocol. FIG. 3 is a schematic diagram of a transmission path of a multicast service flow according to an embodiment of this application. A first node receives, by using an established transmission path, a multicast service flow sent by a multicast source.

It should be noted that the first node is a head node in a multicast detection domain. In this embodiment of this application, a node that is in the multicast detection domain and that first receives a to-be-measured service flow sent by the multicast source is defined as the head node. It can be understood that the first node that receives the service flow is not the first node in the multicast detection domain, and may be any node in the multicast detection domain.

Step S402: The first node encapsulates an IFIT extension header into a data packet in the multicast service flow.

Further, after receiving the multicast service flow, the first node encapsulates the IFIT extension header into each data packet in the multicast service flow. The IFIT extension header includes a first detection identifier. The first detection identifier is a sequence number generated after the first node identifies a multicast service flow (for example, identifies a multicast service flow by using (S-multicast source, G-multicast group) in a multicast packet) and performs matching. The first detection identifier is used to identify a service flow, and may be unique in an entire network in the detection domain. It should be noted that, because the to-be-detected multicast service flow includes one or more data packets, the IFIT extension header is encapsulated in each data packet in the multicast service flow. For example, the first detection identifier corresponds to a Flow ID field in FIG. 1. If the multicast service flow received by the first node is the first one in the network, the first node may determine that a Flow ID value of the service flow is 1. Therefore, the Flow ID value 1 is used to uniquely identify the multicast service flow. If there are 100 other multicast service flows in the network before the first node receives the multicast service flow, the first node may determine that the Flow ID value of the multicast service flow is 101. Therefore, the Flow ID value 101 is used to uniquely identify the multicast service flow.

Step S403: The first node sends first detection information to a control node.

Further, after encapsulating the IFIT extension header into each data packet in the multicast service flow, the first node needs to collect statistics about first quantity information and first time information of the multicast service flow. The first quantity information is a quantity of data packets in the multicast service flow that are received by the first node in a preset period. For example, a flag field of the detected flow (multicast service flow) is alternately colored according to the preset period, and then a quantity of colored packets in this period is counted as the first quantity. The first time information is a timestamp of each data packet in the multicast service flow that is received at a time point in the preset period. For example, in each measurement period, delay coloring is performed on one of the data packets in the detected multicast service flow that are received at a start time point, an end time point, or an intermediate time point in the period, and an ingress timestamp of the data packet is recorded. If the measurement period is 10 seconds, the device may perform delay coloring on data packets that are received at the first second in the first 10 seconds, or may perform delay coloring on data packets that are received at the tenth second in the first 10 seconds.

An ingress of the first node sends the first detection information to the control node according to a preset period, where the first detection information carries a first identifier, and the first identifier may include the ingress of the first node and a value of the first detection identifier. For example, if the ingress of the first node is A, and the value of the first detection identifier is 1, the first identifier may be A1. The first detection information further includes the first quantity information, the first time information, the ingress identifier of the first node, and the first detection identifier.

After the first node parses the data packet in the multicast service flow to obtain one or more of a multicast source address, a multicast group address, a multicast source port, a receive end port, and a multicast protocol number, the first detection information may further include one or more of the multicast source address, the multicast group address, the multicast source port, the receive end port, and the multicast protocol number.

It should be noted that the first node may encapsulate one or more of the first quantity information, the first time information, the ingress identifier of the first node, the first detection identifier, the multicast source address and the multicast group address, the multicast source port, the receive end port, and the multicast protocol number into the first detection information, and then send the first detection information to the control node.

Step S404: The first node copies, according to a quantity of second nodes, the data packet encapsulated with the IFIT extension header.

Further, the control node may obtain a topology of the multicast detection domain in advance, and may determine, from the topology, a transmission path from the multicast source to the multicast group. Therefore, the control node may determine a quantity of copies of the data packet that are made by each node on the transmission path, and then send information about the quantity to each node. For the first node, the control node may obtain a quantity of next-hop nodes of the first node by using the topology, and then send the quantity of next-hop nodes to the first node. The first node may copy, according to the quantity of next-hop second nodes of the first node, the data packet encapsulated with the IFIT extension header, where a detection identifier in the copied IFIT extension header is the same as the first detection identifier. For example, the first detection identifier in the IFIT extension header encapsulated by the first node is 100, and the detection identifier in the data packet encapsulated with the IFIT extension header that is copied by the first node is still 100.

For example, the first node may have three egresses, but only two of the egresses need to forward the data packet. Therefore, when the data packet in the multicast service flow is transmitted to the first node, the first node knows that the data packet needs to be forwarded through only two of the egresses, and therefore makes two copies of the data packet.

Step S405: The first node sends, to the second node, the data packet encapsulated with the IFIT extension header.

Further, the control node may know in advance which egresses of the first node are used to send the data packet. Therefore, the control node may send related egress information to the first node, where the related egress information may be an egress identifier of the first node. Therefore, after obtaining the data packet encapsulated with the IFIT extension header through copying, the first node may send the data packet to the second node through a predetermined egress of the first node.

For example, egress identifiers of the first node that need to be used to send the data packet are respectively represented as B and C, and port numbers of ingresses of next-hop nodes connected to the egress B and the egress C are respectively represented as D and L. When the data packet in the multicast service flow is transmitted to the first node, the first node knows that the data packet needs to enter a next node from two egresses of the first node, and makes two copies of the data packet. One copy of the data packet is forwarded from the egress B to the ingress D of the next-hop node, and the other copy is forwarded from the egress C to the ingress L of the next-hop node.

Step S406: The first node sends a second detection message to the control node.

Further, after sending the data packet encapsulated with the IFIT extension header to each next-hop second node, the first node needs to collect statistics about the second quantity information and the second time information of the multicast service flow. The second quantity information is a quantity of data packets in the multicast service flow that are sent by the first node in a preset period. For example, according to the preset period for collecting statistics about the ingress end of the first node, the quantity of colored packets sent in the preset period is counted as the first quantity. The first time information is a timestamp of each data packet in the multicast service flow that is sent in the preset period. For example, according to the preset period for collecting statistics about the ingress end of the first node, an egress timestamp of each delay-colored data packet in the detected multicast service flow in each period is recorded.

An egress of the first node sends the second detection information to the control node according to a preset period, where the second detection information carries a second identifier, and the second identifier may be formed by the egress of the first node and a value of the first detection identifier. For example, if the egress of the first node is B, and the value of the first detection identifier is 1, the second identifier may be B1. The second detection information includes one or more of the second quantity information, the second time information, the egress identifier of the first node, and the first detection identifier.

Optionally, after the first node parses the data packet in the multicast service flow to obtain one or more of a multicast source address, a multicast group address, a multicast source port, a receive end port, and a multicast protocol number, the second detection information may further include one or more of the multicast source address, the multicast group address, the multicast source port, the receive end port, and the multicast protocol number.

It should be noted that the first node may encapsulate one or more of the second quantity information, the second time information, the egress identifier of the first node, the first detection identifier, the multicast source address and the multicast group address, the multicast source port, the receive end port, and the multicast protocol number into the second detection information, and then send the second detection information to the control node.

It should be noted that a quantity of copies of egress-related detection information of the first interface that need to be sent should be equal to a quantity of egresses of the first node that need to be used to send the data packet to the first-hop node of the first node. For example, if the data packet is sent through the egress B of the first node, detection information of the egress B needs to be sent to the control node, or if the data packet is sent through the egress C of the first node, detection information of the egress C needs to be sent to the control node.

Step S407: The second node receives the data packet encapsulated with the IFIT extension header that is sent by the first node.

Further, the control node may predetermine the multicast detection domain, so as to determine the head node and the tail node. On a transmission path in the detection domain, an intermediate node is located between the head node and the tail node. The second node is an intermediate node in the multicast detection domain. It can be understood that there may be at least one intermediate node on the transmission path, but there may be one node that receives the data packet encapsulated with the IFIT extension header that is sent by the first node.

Step S408: The second node sends third detection information to the control node.

Further, after receiving the data packet encapsulated with the IFIT extension header that is sent by the first node, the second node needs to collect statistics about third quantity information and third time information of the multicast service flow. The third quantity information is a quantity of data packets in the multicast service flow that are received by the second node in a preset period. For example, according to the preset period for collecting statistics about the ingress end of the first node, the quantity of colored packets received by the second node in the preset period is counted as the third quantity. The third time information is a timestamp of each data packet in the multicast service flow that is received by the second node in the preset period. For example, according to the preset period for collecting statistics about the ingress end of the first node, the second node records an ingress timestamp of each delay-colored data packet in the detected multicast service flow in each period.

An ingress of the second node sends the third detection information to the control node according to a preset period, where the third detection information carries a third identifier, and the third identifier may include the ingress of the second node and the value of the first detection identifier. For example, if an ingress identifier of the second node is D, and the value of the first detection identifier is 1, the second identifier may be D1. The third detection information includes one or more of the third quantity information, the third time information, the ingress identifier of the second node, and the first detection identifier.

Optionally, after the second node parses the data packet in the multicast service flow to obtain one or more of a multicast source address, a multicast group address, a multicast source port, a receive end port, and a multicast protocol number, the third detection information may further include one or more of the multicast source address, the multicast group address, the multicast source port, the receive end port, and the multicast protocol number.

It should be noted that the second node may encapsulate one or more of the third quantity information, the third time information, the ingress identifier of the second node, the first detection identifier, the multicast source address and the multicast group address, the multicast source port, the receive end port, and the multicast protocol number into the third detection information, and then send the third detection information to the control node.

Step S409: The second node copies, according to a quantity of third nodes, the data packet encapsulated with the IFIT extension header.

Further, the control node may obtain a topology of the multicast detection domain in advance, and may determine, from the topology, a transmission path from the multicast source to the multicast group. Therefore, the control node may determine a quantity of data packets copied by each node on the transmission path, and then send information about the quantity to each node. For the second node, the control node may obtain, from the topology, a quantity of next-hop nodes of the second node, and then send the quantity of next-hop nodes to the second node. The second node may copy, according to a quantity of next-hop third nodes of the second node, the data packet encapsulated with the IFIT extension header, where a detection identifier in the copied IFIT extension header is the same as the first detection identifier. For example, the detection identifier in the data packet encapsulated with the IFIT extension header that is copied by the second node is also 100. For example, the second node may have four egresses, but only two of the egresses need to forward the data packet. Therefore, when the data packet in the multicast service flow is transmitted to the second node, the second node knows that the data packet needs to be forwarded through only two of the egresses, and therefore makes two copies of the data packet.

Step S410: The second node sends, to the third node, the data packet encapsulated with the IFIT extension header.

Further, the control node may know in advance which egresses of the second node are used to send the data packet to the third node. Therefore, the control node may send related egress information to the second node, where the related egress information may be an egress identifier of the second node. Therefore, after obtaining the data packet encapsulated with the IFIT extension header through copying, the second node may send the data packet to the second node through a predetermined egress of the second node.

It can be understood that at least one intermediate node may exist on the multicast transmission path. When there is one intermediate node, the second node that sends the data packet to the third node may be the second node that receives the data packet sent by the first node. When there are two intermediate nodes, the second node that sends the data packet to the third node and the second node that receives the data packet sent by the first node are not the same node. A second node 1 may receive the data packet sent by the first node, and then send the data packet to a second node 2, and the second node 2 sends the data packet to the third node.

For example, egress identifiers of the second node that need to be used to send the data packet are respectively represented as E and F, and port numbers of ingresses of next-hop nodes connected to the egress E and the egress F are respectively represented as G and K. When the data packet in the multicast service flow is transmitted to the first node, the first node knows that the data packet needs to enter a next node from two egresses of the first node, and makes two copies of the data packet. One copy of the data packet is forwarded from the egress E to the ingress G of the next-hop node, and the other copy is forwarded from the egress F to the ingress K of the next-hop node.

Step S411: The second node sends a fourth detection message to the control node.

Further, after sending the data packet encapsulated with the IFIT extension header to each next-hop third node, the second node needs to collect statistics about the fourth quantity information and the fourth time information of the multicast service flow. The fourth quantity information is a quantity of data packets in the multicast service flow that are sent by the second node in a preset period. For example, according to the preset period for collecting statistics about the ingress end of the first node, the quantity of colored packets sent in the preset period is counted as the fourth quantity. The fourth time information is a timestamp of each data packet in the multicast service flow that is sent in the preset period. For example, according to the preset period for collecting statistics about the ingress end of the first node, an egress timestamp of each delay-colored data packet in the detected multicast service flow in each period is recorded.

An egress of the second node sends the fourth detection information to the control node according to a preset period, where the fourth detection information carries a fourth identifier, and the fourth identifier may be formed by the egress of the second node and a value of the first detection identifier. For example, if the egress of the second node is E, and the value of the first detection identifier is 1, the second identifier may be E1. The fourth detection information includes one or more of the fourth quantity information, the fourth time information, the egress identifier of the second node, and the first detection identifier.

Optionally, after the second node parses the data packet in the multicast service flow to obtain one or more of a multicast source address, a multicast group address, a multicast source port, a receive end port, and a multicast protocol number, the second detection information may further include one or more of the multicast source address, the multicast group address, the multicast source port, the receive end port, and the multicast protocol number.

It should be noted that the second node may encapsulate one or more of the fourth quantity information, the fourth time information, the egress identifier of the second node, the first detection identifier, the multicast source address and the multicast group address, the multicast source port, the receive end port, and the multicast protocol number into the fourth detection information, and then send the fourth detection information to the control node.

Step S412: The third node receives the data packet encapsulated with the IFIT extension header that is sent by the second node.

Further, the control node may predetermine a multicast detection domain, so as to obtain a topology of the detection domain. The third node is a tail node in the multicast detection domain, and is used as a node that sends, in the multicast detection domain, a data packet in the multicast service flow to a receive end.

It can be understood that, regardless of a quantity of intermediate nodes that may exist on the multicast transmission path, the third node receives the data packet encapsulated with the IFIT extension header that is sent by a previous-hop second node.

Step S413: The third node sends fifth detection information to the control node.

Further, after receiving the data packet encapsulated with the IFIT extension header that is sent by the previous-hop second node, the third node needs to collect statistics about fifth quantity information and fifth time information of the multicast service flow. The fifth quantity information is a quantity of data packets in the multicast service flow that are received by the third node in a preset period. For example, according to the preset period for collecting statistics about the ingress end of the first node, the quantity of colored packets received in the preset period is counted as the fifth quantity. The fifth time information is a timestamp of each data packet in the multicast service flow that is received in the preset period. For example, according to the preset period for collecting statistics about the ingress end of the third node, an ingress timestamp of each delay-colored data packet in the detected multicast service flow in each period is recorded.

An ingress of the third node sends the fifth detection information to the control node according to a preset period, where the fifth detection information carries a fifth identifier, and the fifth identifier may include the ingress of the third node and the value of the first detection identifier. For example, if the ingress of the third node is G, and the value of the first detection identifier is 1, the fifth identifier may be G1. The fifth detection information includes one or more of the fifth quantity information, the fifth time information, the ingress identifier of the third node, and the first detection identifier.

Optionally, after the third node parses the data packet in the multicast service flow to obtain one or more of a multicast source address, a multicast group address, a multicast source port, a receive end port, and a multicast protocol number, the fifth detection information may further include one or more of the multicast source address, the multicast group address, the multicast source port, the receive end port, and the multicast protocol number.

It should be noted that the third node may encapsulate one or more of the fifth quantity information, the fifth time information, the ingress identifier of the third node, the first detection identifier, the multicast source address and the multicast group address, the multicast source port, the receive end port, and the multicast protocol number into the fifth detection information, and then send the fifth detection information to the control node.

Step S414: The third node decapsulates the data packet encapsulated with the IFIT extension header to obtain the data packet.

Further, because a main purpose of the IFIT extension header is to perform performance detection such as a packet loss and a delay on the multicast service flow, when the multicast service flow is transmitted to the tail node of the detection domain, the tail node needs to decapsulate the data packet encapsulated with the IFIT extension header to obtain the data packet, where the data packet is data that a receive end in a multicast group is interested in.

Step S415: The third node copies the data packet according to a quantity of receive ends.

Further, the control node may obtain a topology of the multicast detection domain in advance, and may determine, from the topology, a transmission path from the multicast source to the multicast group. Therefore, the control node may determine a quantity of data packets copied by each node on the transmission path, and then send information about the quantity to each node. For the third node, the control node may obtain, from the topology, the quantity of receive ends in the multicast group, and then send the quantity of receive ends to the third node. The third node may copy, according to the quantity of receive ends, the data packet encapsulated with the IFIT extension header. It should be noted that the receive end may be considered as a next-hop node of the third node.

For example, the third node may have five egresses, but only three of the egresses need to forward the data packet. Therefore, when the data packet in the multicast service flow is transmitted to the third node, the third node knows that the data packet needs to be forwarded through only three of the egresses, and therefore makes three copies of the data packet.

Step S416: The third node sends the data packet to the receive end.

Further, the control node may know in advance which egresses of the third node are used to send the data packet to the receive end. Therefore, the control node may send related egress information to the third node, and the related egress information may be an egress identifier of the third node. Therefore, after obtaining the data packet encapsulated with the IFIT extension header through copying, the third node may send the data packet to the receive end through a predetermined egress of the third node.

For example, egress identifiers of the third node that need to be used to forward the data packet are respectively represented as H, I, and J, and next-hop nodes connected to the egress H, the egress I, and the egress J are respectively a receive end 1, a receive end 2, and a receive end 3. When the data packet in the multicast service flow is transmitted to the third node, the third node knows that the data packet needs to enter a next node from three egresses of the third node, and makes three copies of the data packet. One copy of the data packet is forwarded from the egress H to the receive end 1, another copy is forwarded from the egress I to the receive end 2, and the last copy of the data packet is forwarded from the egress J to the receive end 3.

Step S417: The third node sends a sixth detection message to the control node.

Further, after sending the data packet to the receive end, the third node needs to collect statistics about sixth quantity information and sixth time information of the multicast service flow. The sixth quantity information is a quantity of data packets in the multicast service flow that are sent by the third node in a preset period. For example, according to the preset period for collecting statistics about the ingress end of the first node, the third node counts the quantity of colored packets sent in the preset period as the sixth quantity. The sixth time information is a timestamp of each data packet in the multicast service flow that is sent in the preset period. For example, according to the preset period for collecting statistics about the ingress end of the first node, the third node records an egress timestamp of each delay-colored data packet in the detected multicast service flow in each period.

The egress of the third node sends the sixth detection information to the control node according to a preset period, where the sixth detection information carries a sixth identifier, and the sixth identifier may be formed by the egress of the third node and a value of the first detection identifier. For example, if the egress of the sixth node is H, and the value of the first detection identifier is 1, the second identifier may be H1. The sixth detection information includes one or more of the sixth quantity information, the sixth time information, the egress identifier of the third node, and the first detection identifier.

Optionally, after the third node parses the data packet in the multicast service flow to obtain one or more of a multicast source address, a multicast group address, a multicast source port, a receive end port, and a multicast protocol number, the sixth detection information may further include one or more of the multicast source address, the multicast group address, the multicast source port, the receive end port, and the multicast protocol number.

It should be noted that the third node may encapsulate one or more of the sixth quantity information, the sixth time information, the egress identifier of the third node, the first detection identifier, the multicast source address and the multicast group address, the multicast source port, the receive end port, and the multicast protocol number into the sixth detection information, and then send the sixth detection information to the control node.

It should be noted that a quantity of copies of egress-related detection information that need to be sent should be equal to a quantity of egresses of the third node that need to be used to send the data packet to the receive end. For example, if the data packet needs to be sent to the receive end 1 through the egress I of the third node, the detection information of the egress I needs to be sent to the control node.

Step S418: The control node performs performance detection on the multicast service flow.

Further, the control node may receive the detection information sent by each node in the detection domain, and the first detection identifier in the detection information is the same. Therefore, the control node may consider that the detection information is detection information of a same multicast service flow, and may perform performance detection on the multicast service flow according to the detection information.

For E2E packet loss detection and delay detection, the E2E packet loss detection and the delay detection are performed according to the first detection information sent by the head node (the ingress A) and the sixth detection information sent by the tail node. For example, assuming that the data packet is sent to the receive end by using three egresses (the egress H, the egress I, and the egress J) of the tail node, the sixth detection information sent by the tail node to the control node may include node information of the three egresses. In this case, {the quantity of data packets received by the ingress A of the head node—the quantity of data packets sent by the egress H of the tail node}, {the quantity of data packets received by the ingress A of the head node–the quantity of data packets sent by the egress I of the tail node}, and {the quantity of data packets received by the ingress A of the head node–the quantity of data packets sent by the egress J of the tail node} are separately calculated to determine whether a packet loss occurs on the data transmission path between the head node and the tail node.

For hop-by-hop packet loss detection and delay detection, the packet loss detection and the delay detection may be performed on the head node according to the first detection information and the second detection information that are sent by the head node, the packet loss detection and the delay detection may be performed on the intermediate node according to the third detection information and the fourth detection information that are sent by the intermediate node, and the packet loss detection and the delay detection may be performed on the tail node according to the fifth detection information and the sixth detection information that are sent by the tail node. In addition, packet loss detection and delay detection may be performed on the path between the head node and the intermediate node by using the second detection information sent by the head node and the third detection information sent by the intermediate node.

It should be noted that the procedure steps of the method for detecting a multicast service flow provided in this embodiment of this application may not be limited to the procedure steps shown in FIG. 5A to FIG. 5C. For example, for a sequence between step S402, step S403, and step S404, step S403 may be performed first, and then step S402 and step S404 are performed. For another example, for a sequence between step S408 and step 409, step 409 may be performed first, and then step 408 is performed. This is not limited in this embodiment of this application.

The methods in embodiments of this application are described above in detail, and apparatuses in embodiments of this application are provided below.

Figure 6:
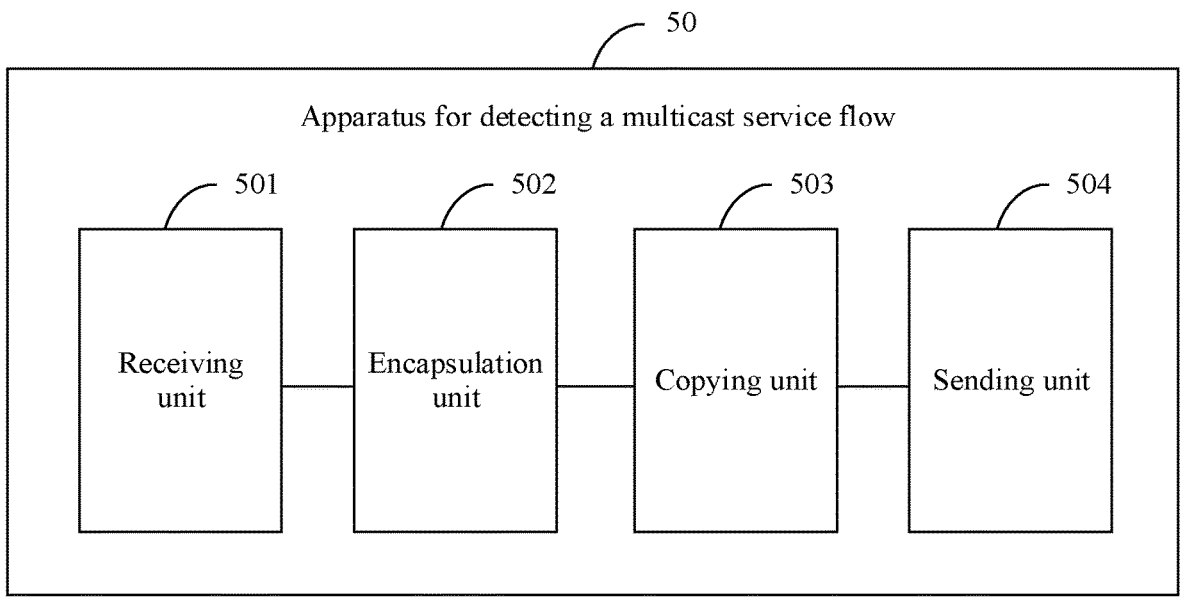
FIG. 6 is a schematic diagram of a structure of an apparatus for detecting a multicast service flow according to an embodiment of this application.

FIG. 6 is a schematic diagram of a structure of an apparatus 50 for detecting a multicast service flow according to an embodiment of this application. The apparatus 50 may be a node, or may be a component in a node, for example, a chip or an integrated circuit. The detection apparatus 50 may include a receiving unit 501, an encapsulation unit 502, a copying unit 503, and a sending unit 504. The detecting apparatus 50 is configured to implement the foregoing method for detecting a multicast service flow, for example, the method for detecting a multicast service flow according to any one of the embodiments shown in FIG. 3, FIG. 4, and FIG. 5A to FIG. 5C.

It should be understood that, in the apparatus embodiments of this application, division into a plurality of units or modules is merely logical division based on functions, and is not intended to limit a specific structure of the apparatus. In specific implementation, some function modules may be subdivided into more smaller function modules, and some function modules may be combined into one function module. However, regardless of whether the function modules are subdivided or combined, a general process executed by the apparatus 50 in a process of detecting a multicast service flow is the same. For example, the receiving unit 501, the encapsulation unit 502, the copying unit 503, and the sending unit 504 in the apparatus 50 may also be combined into a communication unit. Usually, each unit corresponds to respective program code (or program instructions). When the program code corresponding to the unit is run on a processor, the unit executes a corresponding procedure to implement a corresponding function.

In some possible implementations, the apparatus 50 may be the first node in the embodiment shown in FIG. 3, FIG. 4, or FIG. 5A to FIG. 5C, and the units are described as follows: a receiving unit 501 configured to receive a multicast service flow sent by a multicast source, an encapsulation unit 502 configured to encapsulate an IFIT extension header into a data packet in the multicast service flow, where the IFIT extension header includes a first detection identifier, and the first detection identifier is used to identify the detected multicast service flow, a copying unit 503 configured to copy, according to a quantity of next-hop second nodes of the first node, the data packet encapsulated with the IFIT extension header, and a sending unit 504 configured to send the data packet encapsulated with the IFIT extension header to each next-hop second node.

In a possible implementation, a detection identifier in the copied IFIT extension header is the same as the first detection identifier.

In a possible implementation, the copied IFIT extension header includes a second detection identifier, the second detection identifier is different from the first detection identifier, and the second detection identifier includes the first detection identifier.

In a possible implementation, the receiving unit 503 is further configured to receive configuration information, where the configuration information is used to indicate a copying mode.

In a possible implementation, the apparatus 50 further includes a first obtaining unit 5011 configured to obtain first quantity information and first time information, where the first quantity information is a quantity of data packets in the multicast service flow that are received in a preset period, and the first time information is a timestamp of each data packet in the multicast service flow that is received at a time point in the preset period, and a first sending unit 5012 configured to send first detection information to a control node, where the first detection information includes one or more of the first quantity information, the first time information, an ingress identifier of the first node, and the first detection identifier, and the first detection information is used by the control node to perform packet loss detection or delay detection on the multicast service flow.

In a possible implementation, before the sending unit 504 sends the first detection information to the control node, the apparatus 50 further includes a parsing unit 5013 configured to parse a data packet in the multicast service flow to obtain a multicast source address and a multicast group address, where the first detection information further includes the multicast source address and the multicast group address.

In a possible implementation, the apparatus 50 further includes a second obtaining unit 5014 configured to obtain second quantity information and second time information, where the second quantity information is a quantity of data packets encapsulated with the IFIT extension header in the multicast service flow that are sent in a preset period, and the second time information is a timestamp of each data packet encapsulated with the IFIT extension header in the multicast service flow that is sent in the preset period, and a second sending unit 5015 configured to send second detection information to the control node, where the second detection information includes one or more of the second quantity information, the second time information, the first detection identifier, and an egress identifier of the first node, and the second detection information is used by the control node to perform packet loss detection or delay detection on the multicast service flow.

It should be noted that, for implementation of each unit, reference may be made to corresponding descriptions in the embodiments shown in FIG. 3, FIG. 4, and FIG. 5A to FIG. 5C.

Figure 7:
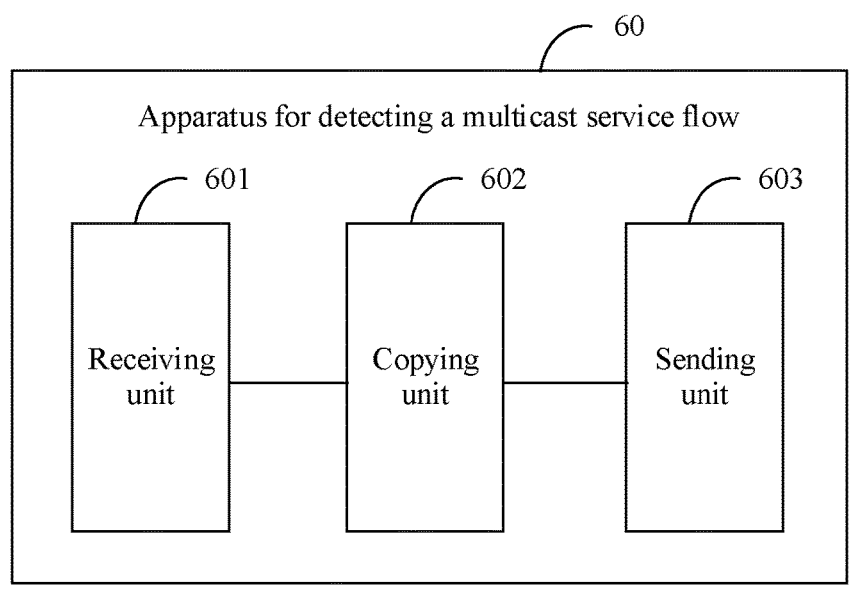
FIG. 7 is a schematic diagram of a structure of another apparatus for detecting a multicast service flow according to an embodiment of this application.

Referring to FIG. 7, FIG. 7 is a schematic diagram of a structure of an apparatus 60 for detecting a multicast service flow according to an embodiment of this application. The apparatus 60 may be a node, or may be a component in a node, for example, a chip or an integrated circuit. The detection apparatus 60 may include a receiving unit 601, a copying unit 602, and a sending unit 603. The detecting apparatus 60 is configured to implement the foregoing method for detecting a multicast service flow, for example, the method for detecting a multicast service flow according to any one of the embodiments shown in FIG. 3, FIG. 4, and FIG. 5A to FIG. 5C.

It should be understood that, in the apparatus embodiments of this application, division into a plurality of units or modules is merely logical division based on functions, and is not intended to limit a specific structure of the apparatus. In specific implementation, some function modules may be subdivided into more smaller function modules, and some function modules may be combined into one function module. However, regardless of whether the function modules are subdivided or combined, a general process executed by the apparatus 60 in a process of detecting a multicast service flow is the same. For example, the receiving unit 601 and the sending unit 603 in the apparatus 60 may also be combined into a communication unit. Usually, each unit corresponds to respective program code (or program instructions). When the program code corresponding to the unit is run on a processor, the unit executes a corresponding procedure to implement a corresponding function.

In some possible implementations, the apparatus 60 may be the second node in the embodiment shown in FIG. 3, FIG. 4, or FIG. 5A to FIG. 5C, and the units are described as follows.

The receiving unit 601 is configured to receive a data packet encapsulated with an IFIT extension header that is sent by a previous-hop first node, where the IFIT extension header includes a first detection identifier, the first detection identifier is used to identify a detected multicast service flow to which the data packet belongs, and the first node is a head node in a multicast group, the copying unit 602 is configured to copy, according to a quantity of next-hop third nodes of the second node, the data packet encapsulated with the IFIT extension header, and the sending unit 603 is configured to send the data packet encapsulated with the IFIT extension header to each next-hop node.

In a possible implementation, a detection identifier in the copied IFIT extension header is the same as the first detection identifier.

In a possible implementation, the copied IFIT extension header includes a second detection identifier, the second detection identifier is different from the first detection identifier, and the second detection identifier includes the first detection identifier.

In a possible implementation, the receiving unit 601 is further configured to receive configuration information, where the configuration information is used to indicate a copying mode.

In a possible implementation, the apparatus 60 further includes a first statistics collecting unit 6011 configured to collect statistics about third quantity information and third time information, where the third quantity information is a quantity of data packets encapsulated with the IFIT extension header in the multicast service flow that are received in a preset period, and the third time information is a timestamp of each data packet encapsulated with the IFIT extension header in the multicast service flow that is received in the preset period, and a first sending unit 6012 configured to send third detection information to the control node, where the third detection information includes one or more of the third quantity information, the third time information, the first detection identifier, and an ingress identifier of the second node, and the third detection information is used by the control node to perform packet loss detection or delay detection on the multicast service flow.

In a possible implementation, the apparatus 60 further includes a second statistics collecting unit 6013 configured to collect statistics about fourth quantity information and fourth time information, where the fourth quantity information is a quantity of data packets encapsulated with the IFIT extension header in the multicast service flow that are sent in a preset period, and the fourth time information is a timestamp of each data packet encapsulated with the IFIT extension header in the multicast service flow that is sent in the preset period, and a second sending unit 6014 configured to send fourth detection information to the control node, where the fourth detection information includes one or more of the fourth quantity information, the fourth time information, the first detection identifier, and an egress identifier of the second node, and the fourth detection information is used by the control node to perform packet loss detection or delay detection on the multicast service flow.

It should be noted that, for implementation of each unit, reference may be made to corresponding descriptions in the embodiments shown in FIG. 3, FIG. 4, and FIG. 5A to FIG. 4C5C

Figure 8:
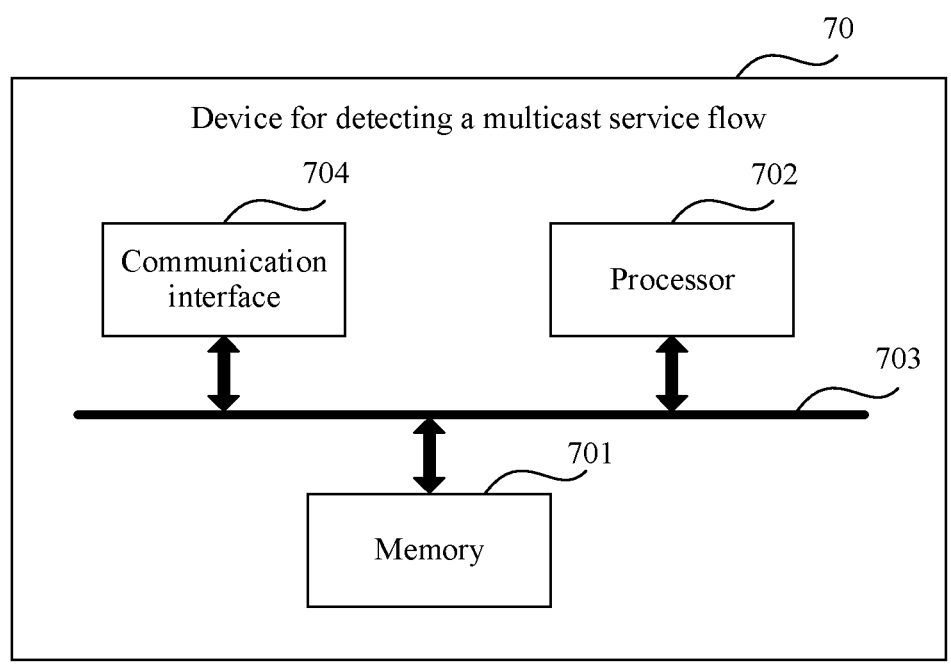
FIG. 8 is a schematic diagram of a structure of a device for detecting a multicast service flow according to an embodiment of this application.

FIG. 8 is a schematic diagram of a structure of a device 70 for detecting a multicast service flow according to an embodiment of this application. The communication apparatus 70 may be a node, or may be a component in a node, for example, a chip or an integrated circuit. The device 70 may include at least one memory 701 and at least one processor 702. Optionally, the device 70 may further include a bus 703. Further, optionally, the apparatus may further include a communication interface 704. The memory 701, the processor 702, and the communication interface 704 are connected by using the bus 703.

The memory 701 is configured to provide storage space, and the storage space may store data such as an operating system and a computer program. The memory 701 may be one or a combination of more than one of a random-access memory (RAM), a read-only memory (ROM), an erasable programmable ROM (EPROM), a portable ROM (e.g., compact disc (CD) ROM (CD-ROM)), or the like.

The processor 702 is a module that performs an arithmetic operation and/or a logic operation, and may be further one or a combination of more than one of processing modules such as a central processing unit (CPU), a graphics processing unit (GPU), a microprocessor (or microprocessor unit (MPU)), an application-specific integrated circuit (ASIC), a field-programmable gate array (FPGA), or a complex programmable logic device (CPLD).

The communication interface 704 is configured to receive data sent from the outside and/or send data to the outside, and may be an interface of a wired link such as an Ethernet cable, or may be an interface of a wireless link (WI-FI, BLUETOOTH, or universal wireless transmission). Optionally, the communication interface 704 may further include a transmitter (for example, a radio frequency transmitter or an antenna) coupled to the interface, a receiver, or the like.

The processor 702 in the apparatus 70 is configured to read the computer program stored in the memory 701, to perform the foregoing BLUETOOTH pairing method, for example, the method for detecting performance of a multicast service flow according to any embodiment of FIG. 3, FIG. 4, or FIG. 5A to FIG. 5C.

In some possible implementations, the device 70 for detecting performance of a multicast service flow may be the first node in the embodiment shown in FIG. 3, FIG. 4, or FIG. 5A to FIG. 5C. The processor 702 in the apparatus 70 is configured to read the computer program stored in the memory 701, and is configured to perform the following operations of receiving a multicast service flow sent by a multicast source, encapsulating an IFIT extension header into a data packet in the multicast service flow, where the IFIT extension header includes a first detection identifier, and the first detection identifier is used to identify the detected multicast service flow, copying, according to a quantity of next-hop second nodes of the first node, the data packet encapsulated with the IFIT extension header, and sending the data packet encapsulated with the IFIT extension header to each next-hop second node.

In a possible implementation, in a possible implementation, a detection identifier in the copied IFIT extension header is the same as the first detection identifier.

In a possible implementation, the copied IFIT extension header includes a second detection identifier, the second detection identifier is different from the first detection identifier, and the second detection identifier includes the first detection identifier.

In a possible implementation, the processor 702 is further configured to receive configuration information, where the configuration information is used to indicate a copying mode.

In a possible implementation, the processor 702 is further configured to collect statistics about first quantity information and first time information, where the first quantity information is a quantity of data packets in the multicast service flow that are received in a preset period, and the first time information is a timestamp of each data packet in the multicast service flow that is received in the preset period, and send first detection information to a control node, where the first detection information includes one or more of the first quantity information, the first time information, an ingress identifier of the first node, and the first detection identifier, and the first detection information is used by the control node to perform packet loss detection or delay detection on the multicast service flow.

In a possible implementation, before being configured to send the first detection information packet to the control node, the processor 702 is further configured to parse a data packet in the multicast service flow to obtain a multicast source address and a multicast group address, where the first detection information further includes the multicast source address and the multicast group address.

In a possible implementation, the processor 702 is further configured to collect statistics about second quantity information and second time information, where the second quantity information is a quantity of data packets encapsulated with the IFIT extension header in the multicast service flow that are sent in a preset period, and the second time information is a timestamp of each data packet encapsulated with the IFIT extension header in the multicast service flow that is sent in the preset period, and send second detection information to the control node, where the second detection information includes one or more of the second quantity information, the second time information, the first detection identifier, and an egress identifier of the first node, and the second detection information is used by the control node to perform packet loss detection or delay detection on the multicast service flow.

It should be noted that, for implementation of each unit, reference may be made to corresponding descriptions in the embodiments shown in FIG. 3, FIG. 4, and FIG. 5A to FIG. 5C.

In some possible implementations, the device 70 for detecting a multicast service flow may be the second node in the embodiments shown in FIG. 3, FIG. 4, and FIG. 5A to FIG. 5C. The processor 702 in the apparatus 70 is configured to read the computer program stored in the memory 701, and is configured to perform the following operations of receiving a data packet encapsulated with an IFIT extension header that is sent by a previous-hop first node, where the IFIT extension header includes a first detection identifier, the first detection identifier is used to identify a detected multicast service flow to which the data packet belongs, and the first node is a head node in a multicast group, copying, according to a quantity of next-hop third nodes of the second node, the data packet encapsulated with the IFIT extension header, and sending the data packet encapsulated with the IFIT extension header to each next-hop node.

In a possible implementation, a detection identifier in the copied IFIT extension header is the same as the first detection identifier.

In a possible implementation, the copied IFIT extension header includes a second detection identifier, the second detection identifier is different from the first detection identifier, and the second detection identifier includes the first detection identifier.

In a possible implementation, the processor 702 is further configured to receive configuration information, where the configuration information is used to indicate a copying mode.

In a possible implementation, the processor 702 is further configured to collect statistics about third quantity information and third time information, where the third quantity information is a quantity of data packets encapsulated with the IFIT extension header in the multicast service flow that are received in a preset period, and the third time information is a timestamp of each data packet encapsulated with the IFIT extension header in the multicast service flow that is received in the preset period, and send third detection information to the control node, where the third detection information includes one or more of the third quantity information, the third time information, the first detection identifier, and an ingress identifier of the second node, and the first detection information is used by the control node to perform packet loss detection or delay detection on the multicast service flow.

In a possible implementation, the processor 702 is further configured to collect statistics about fourth quantity information and fourth time information, where the fourth quantity information is a quantity of data packets encapsulated with the IFIT extension header in the multicast service flow that are sent in a preset period, and the fourth time information is a timestamp of each data packet encapsulated with the IFIT extension header in the multicast service flow that is sent in the preset period, and send fourth detection information to the control node, where the fourth detection information includes one or more of the fourth quantity information, the fourth time information, the first detection identifier, and an egress identifier of the second node, and the fourth detection information is used by the control node to perform packet loss detection or delay detection on the multicast service flow.

An embodiment of this application further provides a computer-readable storage medium. The computer-readable storage medium stores a computer program. When the computer program is run on one or more processors, the method for detecting a multicast service flow according to any one of the embodiments shown in FIG. 3, FIG. 4, and FIG. 5A to FIG. 5C is performed.

An embodiment of this application further provides a chip system. The chip system includes at least one processor, a memory, and an interface circuit. The interface circuit is configured to provide an information input/output for the at least one processor, and the at least one memory stores a computer program. When the computer program is run on one or more processors, the method for detecting a multicast service flow according to any one of the embodiments shown in FIG. 3, FIG. 4, and FIG. 5A to FIG. 5C is performed.

An embodiment of this application further provides a computer program product. When the computer program product runs on one or more processors, the method for detecting a multicast service flow according to any one of the embodiments shown in FIG. 3, FIG. 4, and FIG. 5A to FIG. 5C may be performed.

All or some of the foregoing embodiments may be implemented by using software, hardware, firmware, or any combination thereof. When software is used to implement embodiments, all or some of embodiments may be implemented in a form of a computer instruction product. When the computer instructions are loaded and executed on a computer, the procedures or functions according to embodiments of this application are all or partially implemented. The computer may be a general-purpose computer, a special-purpose computer, a computer network, or another programmable apparatus. The computer instructions may be stored in a computer-readable storage medium, or may be transmitted by using a computer-readable storage medium. The computer-readable storage medium may be any usable medium accessible by the computer, or a data storage device, such as a server or a data center that integrates one or more usable media. The usable medium may be a magnetic medium (for example, a floppy disk, a hard disk or a magnetic tape), an optical medium (for example, DIGITAL VERSATILE DISC (DVD)), a semiconductor medium (for example, a solid-state disk (SSD)), or the like.

Sequence adjustment, combination, or deletion may be performed on the steps in the method embodiments of this application based on an actual requirement.

Combination, division, and deletion may be performed on the modules in the apparatus embodiments of this application based on an actual requirement.

What is claimed is:

1. A first node comprising:
   a receiver configured to receive a multicast service flow from a multicast source, wherein the multicast service flow comprises a first data packet;
   a processor coupled to the receiver and configured to:
      encapsulate an In-situ Flow Information Telemetry (IFIT) extension header into the first data packet to obtain a second data packet, wherein the IFIT extension header comprises a first detection identifier identifying the multicast service flow; and
      copy, according to a quantity of next-hop second nodes of the first node, the second data packet; and
   a transmitter coupled to the processor and configured to send the second data packet to each of the next-hop second nodes.

2. The first node of claim 1, wherein a second detection identifier in a copied IFIT extension header is the same as the first detection identifier.

3. The first node of claim 1, wherein a copied IFIT extension header comprises a second detection identifier, wherein the second detection identifier is different from the first detection identifier, and wherein the second detection identifier comprises the first detection identifier.

4. The first node of claim 1, wherein the receiver is further configured to receive configuration information indicating a copying mode.

5. The first node of claim 1, wherein the processor is further configured to:
   obtain first quantity information of a quantity of third data packets in the multicast service flow and that is received in a first preset period; and
   obtain first time information comprising a first timestamp of each fourth data packet in the multicast service flow that is received at a first time point in the first preset period,
   wherein the transmitter is further configured to send first detection information to a control node, wherein the first detection information comprises one or more of the first quantity information, the first time information, an ingress identifier of the first node, or the first detection identifier, and wherein the first detection information enables the control node to perform packet loss detection or delay detection on the multicast service flow.

6. The first node of claim 5, wherein before sending the first detection information, the processor is further configured to parse a fifth data packet in the multicast service flow to obtain a multicast source address and a multicast group address, and wherein the first detection information further comprises the multicast source address and the multicast group address.

7. The first node of claim 5, wherein the processor is further configured to:
   obtain second quantity information comprising a quantity of fifth data packets encapsulated with the IFIT extension header in the multicast service flow that are sent in a second preset period; and
   obtain second time information comprising a second timestamp of each sixth data packet encapsulated with the IFIT extension header in the multicast service flow that is sent at a second time point in the second preset period, wherein the transmitter is further configured to send second detection information to the control node, wherein the second detection information comprises one or more of the second quantity information, the second time information, the first detection identifier, and an egress identifier of the first node, and wherein the second detection information enables the control node to perform the packet loss detection or the delay detection.

8. A second node comprising:
a receiver configured to receive a first data packet encapsulated with an In-situ Flow Information Telemetry (IFIT) extension header from a first node that is a previous hop of the second node and is a head note in a multicast group, wherein the IFIT extension header comprises a first detection identifier identifying a multicast service flow to which the first data packet belongs;
a processor coupled to the receiver and configured to copy, according to a quantity of third nodes that are next hops of the second node, the first data packet; and
a transmitter coupled to the processor and configured to send the first data packet to each of the third nodes.

9. The second node of claim 8, wherein a second detection identifier in a copied IFIT extension header is the same as the first detection identifier.

10. The second node of claim 8, wherein a copied IFIT extension header comprises a second detection identifier, wherein the second detection identifier is different from the first detection identifier, and wherein the second detection identifier comprises the first detection identifier.

11. The second node of claim 8, wherein the receiver is further configured to receive configuration information indicating a copying mode.

12. The second node of claim 8, wherein the processor is further configured to:
obtain first quantity information comprising a quantity of second data packets encapsulated with the IFIT extension header in the multicast service flow that are received in a first preset period; and
obtain first time information comprising a first timestamp of each third data packet encapsulated with the IFIT extension header in the multicast service flow that is received at a first time point in the first preset period,
wherein the transmitter is further configured to send first detection information to a control node, wherein the first detection information comprises one or more of the first quantity information, the first time information, the first detection identifier, or an ingress identifier of the second node, and wherein the first detection information enables the control node to perform packet loss detection or delay detection on the multicast service flow.

13. The second node of claim 12, wherein the processor is further configured to:
obtain second quantity information comprising a quantity of fourth data packets encapsulated with the IFIT extension header in the multicast service flow that are sent in a second preset period; and
obtain second time information comprising a second timestamp of each fifth data packet encapsulated with the IFIT extension header in the multicast service flow that is sent at a second time point in the second preset period, wherein the transmitter is further configured to send second detection information to the control node, wherein the second detection information comprises one or more of the second quantity information, the second time information, the first detection identifier, or an egress identifier of the second node, and wherein the second detection information enables the control node to perform the packet loss detection or the delay detection.

14. A computer program product comprising computer-executable instructions that are stored on a non-transitory computer-readable storage medium and that, when executed by a processor, cause a first node to:
encapsulate an In-situ Flow Information Telemetry (IFIT) extension header into a data packet in the multicast service flow to obtain a second data packet, wherein the IFIT extension header comprises a first detection identifier identifying the multicast service flow;
copy, according to a quantity of next-hop second nodes of the first node, the second data packet; and
send the second data packet to each of the next-hop second nodes.

15. The computer program product of claim 14, wherein a second detection identifier in a copied IFIT extension header is the same as the first detection identifier.

16. The computer program product of claim 14, wherein a copied IFIT extension header comprises a second detection identifier, wherein the second detection identifier is different from the first detection identifier, and wherein the second detection identifier comprises the first detection identifier.

17. The computer program product of claim 14, wherein the computer-executable instructions further cause the first node to receive configuration information indicating a copying mode.

18. The computer program product of claim 14, wherein the computer-executable instructions further cause the first node to:
obtain first quantity information comprising a quantity of third data packets in the multicast service flow and that is received in a first preset period;
obtain first time information comprising a first timestamp of each fourth data packet in the multicast service flow that is received at a first time point in the first preset period; and
send first detection information to a control node, wherein the first detection information comprises one or more of the first quantity information, the first time information, an ingress identifier of the first node, or the first detection identifier, and wherein the first detection information enables the control node to perform packet loss detection or delay detection on the multicast service flow.

19. The computer program product of claim 18, wherein before sending the first detection information, the computer-executable instructions further cause the first node to parse a fifth data packet in the multicast service flow to obtain a multicast source address and a multicast group address, and wherein the first detection information further comprises the multicast source address and the multicast group address.

20. The computer program product of claim 18, wherein the computer-executable instructions further cause the first node to:
obtain second quantity information comprising a quantity of fifth data packets encapsulated with the IFIT extension header in the multicast service flow that are sent in a second preset period;

obtain second time information comprising a second timestamp of each sixth data packet encapsulated with the IFIT extension header in the multicast service flow that is sent at a second time point in the second preset period; and send second detection information to the control node, wherein the second detection information comprises one or more of the second quantity information, the second time information, the first detection identifier, and an egress identifier of the first node, and wherein the second detection information enables the control node to perform the packet loss detection or the delay detection.

* * * * *